US009588383B2

(12) United States Patent
Kim et al.

(10) Patent No.: US 9,588,383 B2
(45) Date of Patent: Mar. 7, 2017

(54) CURVED LIQUID CRYSTAL DISPLAY DEVICE

(71) Applicant: Samsung Display Co., Ltd., Yongin, Gyeonggi-Do (KR)

(72) Inventors: Jang-Il Kim, Asan-si (KR); Sang-Myoung Lee, Seoul (KR); Yeo Geon Yoon, Suwon-si (KR); Hyun-Ho Kang, Ansan-si (KR); Un Byoll Ko, Yeoju-si (KR); Sei-Yong Park, Suwon-si (KR); O Sung Seo, Seoul (KR); Seung Jun Yu, Cheonan-si (KR); Ha Won Yu, Suwon-si (KR); Ki Kyung Youk, Bucheon-si (KR); Jung Wook Lee, Anyang-si (KR); Sung Hee Hong, Hwaseong-si (KR)

(73) Assignee: SAMSUNG DISPLAY CO., LTD. (KR)

( * ) Notice: Subject to any disclaimer, the term of this patent is extended or adjusted under 35 U.S.C. 154(b) by 0 days.

(21) Appl. No.: 14/750,957

(22) Filed: Jun. 25, 2015

(65) Prior Publication Data

US 2016/0238908 A1    Aug. 18, 2016

(30) Foreign Application Priority Data

Feb. 17, 2015    (KR) ........................ 10-2015-0024041

(51) Int. Cl.
*G02F 1/1343*    (2006.01)
*G02F 1/1362*    (2006.01)
(Continued)

(52) U.S. Cl.
CPC ...... *G02F 1/134336* (2013.01); *G02F 1/1368* (2013.01); *G02F 1/13439* (2013.01); *G02F 1/133345* (2013.01); *G02F 1/136286* (2013.01)

(58) Field of Classification Search
CPC ........ G02G 1/133753; G02F 1/133753; G02F 1/134309; G02F 2001/134345; G02F 2001/1357
(Continued)

(56) References Cited

U.S. PATENT DOCUMENTS

| 2002/0015125 A1* | 2/2002 | Kim ................. G02F 1/133345 349/129 |
| 2011/0019113 A1* | 1/2011 | Saitoh ............... G02F 1/133555 349/33 |
| 2012/0162559 A1* | 6/2012 | Kim ................. G02F 1/134363 349/42 |

FOREIGN PATENT DOCUMENTS

| KR | 10-2013-0104224 | 9/2013 |
| KR | 10-2013-0104521 | 9/2013 |

(Continued)

*Primary Examiner* — Thanh-Nhan P Nguyen
(74) *Attorney, Agent, or Firm* — Innovation Counsel LLP

(57) ABSTRACT

A display device includes a transistor, a data line, a pixel electrode, a common electrode, and a liquid crystal layer. The data line is connected to a source electrode of the transistor. A geometric radius of curvature associated with the display device is perpendicular to the data line. The pixel electrode is connected to a drain electrode of the transistor and includes a plate electrode. Sides of the plate electrode are oriented at acute angles with respect to the data line in a plan view associated with the display device. The common electrode overlaps the pixel electrode and has a slit. The slit has a first edge and a second edge. The first edge is perpendicular to the data line in the plan view and is longer than the second edge. The liquid crystal layer is positioned between the pixel electrode and the common electrode.

20 Claims, 16 Drawing Sheets

(51) Int. Cl.
*G02F 1/1368* (2006.01)
*G02F 1/1333* (2006.01)

(58) Field of Classification Search
USPC .................................. 349/129, 130, 139, 140
See application file for complete search history.

(56) References Cited

FOREIGN PATENT DOCUMENTS

| KR | 10-2014-0021749 | 2/2014 |
| KR | 10-2014-0043198 | 4/2014 |
| KR | 10-2014-0043968 | 4/2014 |

\* cited by examiner

CURVED LIQUID CRYSTAL DISPLAY DEVICE

CROSS-REFERENCE TO RELATED APPLICATION

This application claims priority to and the benefit of Korean Patent Application No. 10-2015-0024041 filed in the Korean Intellectual Property Office on Feb. 17, 2015; the entire contents of the Korean Patent Application are incorporated herein by reference.

BACKGROUND (a) Technical Field

The technical field is related to a curved liquid crystal display device.

(b) Description of Related Art

A liquid crystal display device may include two panels with field generating electrodes, such as pixel electrodes and a common electrode, and may include a liquid crystal layer interposed between the two panels. In the liquid crystal display device, an electric field may be generated in the liquid crystal layer for controlling directions of liquid crystal molecules in the liquid crystal layer to control light transmission through the liquid crystal layer, such that an image may be displayed. A curved liquid crystal display device may provide enhanced user experience.

The above information disclosed in this Background section is for enhancement of understanding of a background related to the invention. The Background section may contain information that does not form the prior art that is already known in this country to a person of ordinary skill in the art.

SUMMARY

Embodiments may be related to a curved liquid crystal display device. Some features may be described based on a plan view associated with the device though the plan view may not be explicitly referred to.

An embodiment may be related to a display device. The display device may include a transistor, a data line, a pixel electrode, a common electrode, and a liquid crystal layer. The data line may be electrically connected to a source electrode of the transistor and may be configured to transmit a data signal. A geometric radius of curvature associated with the display device may be perpendicular to the data line. The pixel electrode may be electrically connected to a drain electrode of the transistor, may include a first plate electrode, and may include first-set branch electrodes. The first-set branch electrodes may be electrically and directly connected to sides (e.g., four sides) of the first plate electrode. The sides of the first plate electrode may be oriented at acute angles with respect to the data line in a plan view associated with the display device. The pixel electrode may represent a sub-pixel electrode. The common electrode may overlap the pixel electrode and may have a first slit. The first slit may have a first edge, a second edge, a third edge, and a fourth edge. Each of the first edge and the third edge may be longer than each of the second edge and the fourth edge. The first edge may be perpendicular to the data line in the plan view. The liquid crystal layer may be positioned between the pixel electrode and the common electrode.

Each of the first edge and the third edge may overlap the first plate electrode.

A center of the plate electrode may be positioned between the first edge and the third edge in the plan view.

The plate electrode may have a rhombus shape in the plan view. A geometric diagonal of the rhombus shape may be positioned between the first edge and the third edge in the plan view.

The pixel electrode may include a second plate electrode and second-set branch electrodes, which may be connected to sides of the second plate electrode. The first plate electrode may be electrically connected to the second plate electrode. A shape of the first plate electrode may be identical to a shape of the second plate electrode in the plan view.

The common electrode may have a second slit. The first edge may overlap the first plate electrode. An edge of the second slit may overlap the second plate electrode.

The first slit may be parallel to the second slit in the plan view.

The first slit may be separated from the second slit and may be aligned with the second slit in a direction perpendicular to the data line in the plan view.

Each of the first edge and the third edge may overlap each of the first plate electrode and the second plate electrode.

The display device may include a metal member, which may be insulated from the pixel electrode. A center and/or a geometric diagonal of the first plate electrode may be positioned between the metal member and the liquid crystal layer. A center and/or a geometric diagonal of the second plate electrode may be positioned between the metal member and the liquid crystal layer.

The display device may include a first metal member and a second metal member. The first metal member may extend parallel to the data line in the plan view. The first plate electrode may be positioned between the first metal member and the liquid crystal layer. The second metal member may extend parallel to the data line in the plan view. The second plate electrode may be positioned between the second metal member and the liquid crystal layer.

The display device may include a metal member, which may be insulated from the pixel electrode. The first plate electrode may be positioned between the metal member and the liquid crystal layer.

The display device may include a passivation layer, which may directly contact the data line, may be positioned between the data line and the liquid crystal layer, and may be positioned between the metal member and the liquid crystal layer.

The passivation layer may directly contact the metal member.

The display device may include a gate line, which may be electrically connected to a gate electrode of the transistor. The display device may include an insulating layer, which may directly contact each of the gate line and the metal member.

The metal member may cross the first slit in the plan view.

A geometric diagonal of the first plate electrode may be positioned between two edges of the metal member in the plan view.

An embodiment may be related to a display device. The display device may include a transistor, a data line, a first metal member, a common electrode, a liquid crystal layer, and a pixel electrode. The data line may be electrically connected to a source electrode of the transistor and may be configured to transmit a data signal. A geometric radius of curvature associated with the display device may be perpendicular to the data line. The common electrode may overlap the first metal member. The liquid crystal layer may be positioned between the first metal member and the common electrode. The pixel electrode may be electrically connected to a drain electrode of the transistor, may be insulated from the first metal member, may include a plate electrode, and may include branch electrodes. The plate electrode may be positioned between the first metal member and the liquid crystal layer. The branch electrodes may be electrically and directly connected to sides of the first plate electrode. The sides of the first plate electrode may be oriented at acute angles with respect to the data line in a plan view associated with the display device.

The display device may include a second metal member, which may be insulated from the plate electrode and may extend perpendicular to the data line in the plan view. The plate electrode may be positioned between the second metal member and the liquid crystal layer. The first metal member may extend parallel to the data line in the plan view.

A geometric diagonal of the plate electrode may be positioned between to edges of the first metal member in the plan view.

The second metal member may be directly connected to the first metal member.

The second metal member may cross the first metal member at a center of the plate electrode in the plan view.

A material of the second metal member may be different from or identical to a material of the first metal member.

An embodiment may be related to a display device. The display device may include a transistor, a data line, a pixel electrode, a common electrode, and a liquid crystal layer. The data line may be electrically connected to a source electrode of the transistor and is configured to transmit a data signal. A geometric radius of curvature associated with the display device is perpendicular to the data line. The pixel electrode may be electrically connected to a drain electrode of the transistor and may have a recess in a plan view associated with the display device. A first portion of the recess may be narrower than a second portion of the recess in a direction parallel to the data line in the plan view. The common electrode may overlap the pixel electrode and may have a slit. The recess may be positioned between a first portion of the slit and a second portion of the slit in the plan view. The first portion of the recess may be positioned between the slit and the second portion of the recess in the plan view. The liquid crystal layer may be positioned between the pixel electrode and the common electrode.

An embodiment may be related to a curved liquid crystal display device (or curved liquid crystal display for conciseness). The curved liquid crystal display may be bent with respective to (or relative to) a first direction. The curved liquid may include the following elements: a first substrate and a second substrate facing each other; a pixel electrode formed on the first substrate and including a plate electrode and a plurality of minute branch electrodes extending from the plate electrode; a common electrode positioned on the second substrate and including a slit, the slit extending in a direction parallel to the first direction in a plan view associated with the curved liquid crystal display; and a liquid crystal layer positioned between the first substrate and the second substrate.

Edges of the slit may overlap the plate electrode.

A center of the plate electrode may be positioned between edges of the slit in the plan view.

The plate electrode may have a rhombus shape, and a transverse diagonal of the rhombus shape may be positioned between edges of the slit in the plan view.

The curved liquid crystal display may include a gate line and a data line positioned on the first substrate and crossing each other may. The slit may extend parallel to the gate line in the plan view.

The pixel electrode may include a plurality of plate electrodes, and the plate electrodes may be disposed in a matrix (or array) in the plan view.

Edges of the slit may overlap the plurality of plate electrodes.

The common electrode may have a plurality of slits. The slits may have edges that respectively overlap the plate electrodes. The slits may be separated from each other.

The plate electrodes may be aligned in the first direction in the plan view and may be connected to each other.

The curved liquid crystal display may include first metal member positioned on the first substrate. The first metal member may overlap the pixel electrode.

The first metal member may overlap the plate electrode.

The first metal member may overlap the center of the plate electrode.

The plate electrode may have a rhombus shape, and the first metal member may overlap the longitudinal diagonal of the rhombus shape.

The transverse diagonal of the rhombus shape may be positioned between two edges of the slit in the plan view.

The first metal member may extend in a second direction perpendicular to the first direction in the plan view.

The curved liquid crystal display may include gate line and a data line positioned on the first substrate and crossing to each other. The first metal member may be formed with the same material layer as the gate line or the data line.

An embodiment may be related to a curved liquid crystal display, which may be bent with respect to a first direction. The curved liquid crystal display may include the following elements: a first substrate and a second substrate facing each other; a first metal member and a second metal member positioned on the first substrate; a pixel electrode positioned on the first substrate and including a plate electrode overlapping the first metal member and the second metal member and a plurality of minute branch electrodes extending from the plate electrode; a common electrode positioned on the second substrate; and a liquid crystal layer positioned between the first substrate and the second substrate.

The first metal member may extend in a second direction perpendicular to the first direction in the plan view, and the second metal member may extend in the first direction in the plan view.

The plate electrode may have a rhombus shape in the plan view, the first metal member may overlap the longitudinal diagonal of the rhombus shape, and the second metal member may overlap the transverse diagonal of the rhombus shape.

The curve liquid crystal display may include gate line and a data line positioned on the first substrate and crossing each other. The first metal member and the second metal member may be formed with the same material layer as the gate line or the data line.

According to embodiments, in a display device, a common electrode may include one or more slits that extend perpendicular to, and not parallel to, a data line in a plan view associated with the display device. Therefore, even if misalignment occurs between a pixel electrode and the common electrode as a result of bending of the display device, control of the liquid crystal layer and light transmittance may not be significantly affected by the misalignment. Advantageously, the display device may display images with consistent and/or satisfactory quality.

DETAILED DESCRIPTION OF EMBODIMENTS

Figure 1:
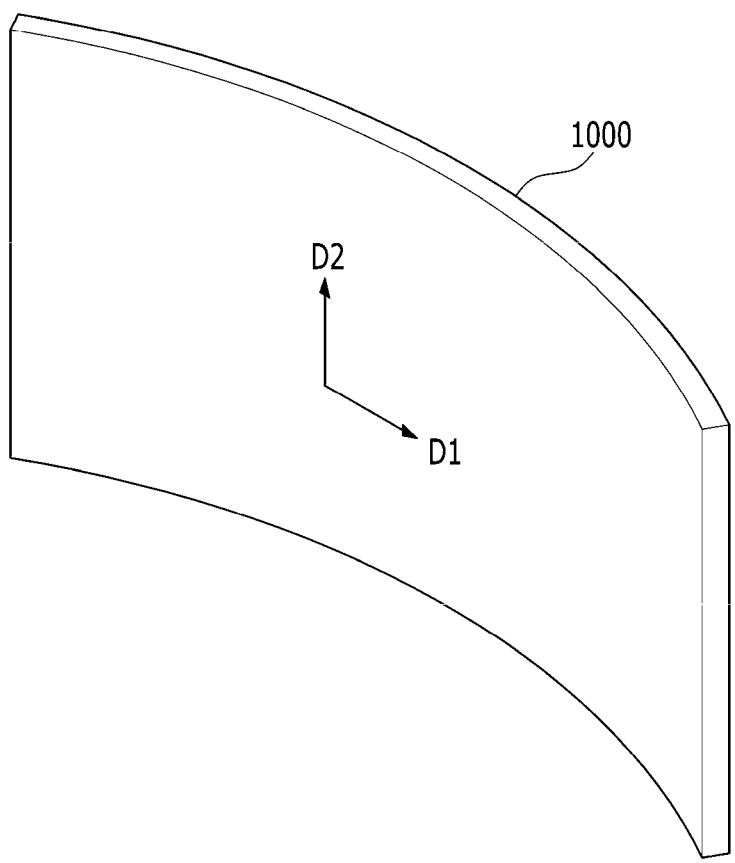
FIG. 1 is a schematic perspective view illustrating a curved liquid crystal display device (or curved liquid crystal display for conciseness) according to an embodiment.

Some embodiments are described with reference to the accompanying drawings. As those skilled in the art would realize, the described embodiments may be modified in various ways.

Although the terms "first", "second", etc. may be used herein to describe various elements, these elements should not be limited by these terms. These terms may be used to distinguish one element from another element. Thus, a first element discussed below may be termed a second element without departing from teachings of one or more embodiments. The description of an element as a "first" element may not require or imply the presence of a second element or other elements. The terms "first", "second", etc. may also be used to differentiate different categories or sets of elements. For conciseness, the terms "first", "second", etc. may represent, for example, "first-category (or first-set)", "second-category (or second-set)", etc., respectively.

In the drawings, thicknesses of layers, films, panels, regions, etc., may be exaggerated for clarity. Like reference numerals may designate like elements. When a first element (such as a layer, film, region, or substrate) is referred to as being "on" a second element, the first element can be directly on the second element, or one or more intervening elements may also be present. When a first element is referred to as being "directly on" a second element, there are no intended intervening elements provided between the first element and the second element.

The term "connect" may mean "electrically connect". The term "insulate" may mean "electrically insulate". The phrase "formed on" may mean "formed, provided, and/or positioned on". The term "layer" may mean "material layer".

A drawing and related description may use a particular position and/or orientation of a device as an example. The device may have various positions and/or orientations.

A drawing may represent a plan view projected on a plane. Some curved elements and/or some curved structures may appear flat and/or straight in the plan view. Some elements, structures, and/or features may be described based on the plan view without explicitly referring to or reciting the plan view. Description related to analogous features and/or identical features may not be repeated.

Figure 2:
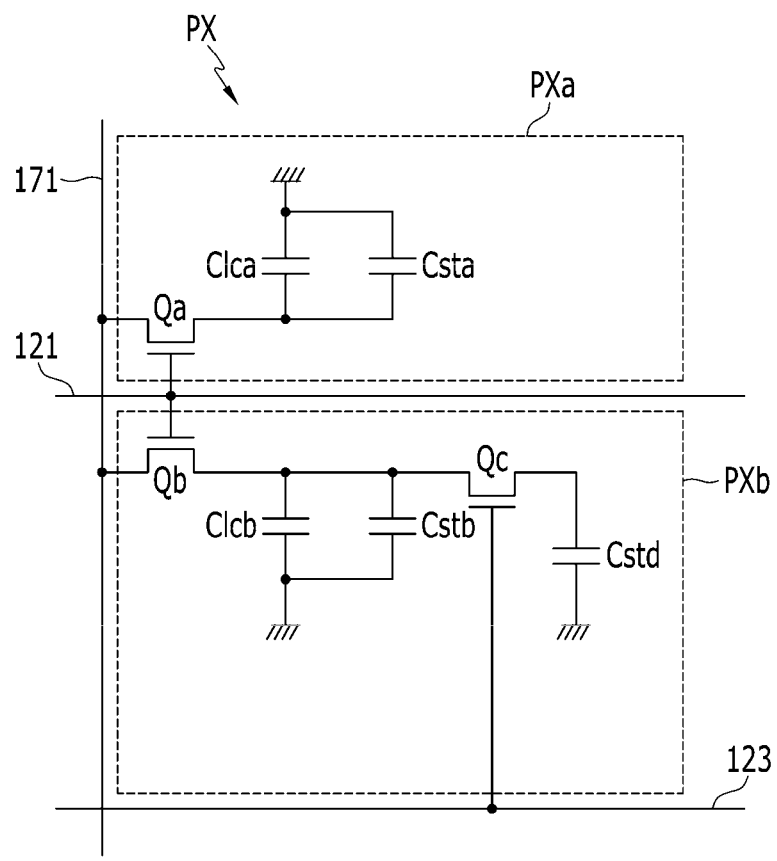
FIG. 2 is a schematic circuit diagram illustrating elements and/or structures in a pixel of a curved liquid crystal display according to an embodiment.
Figure 3:
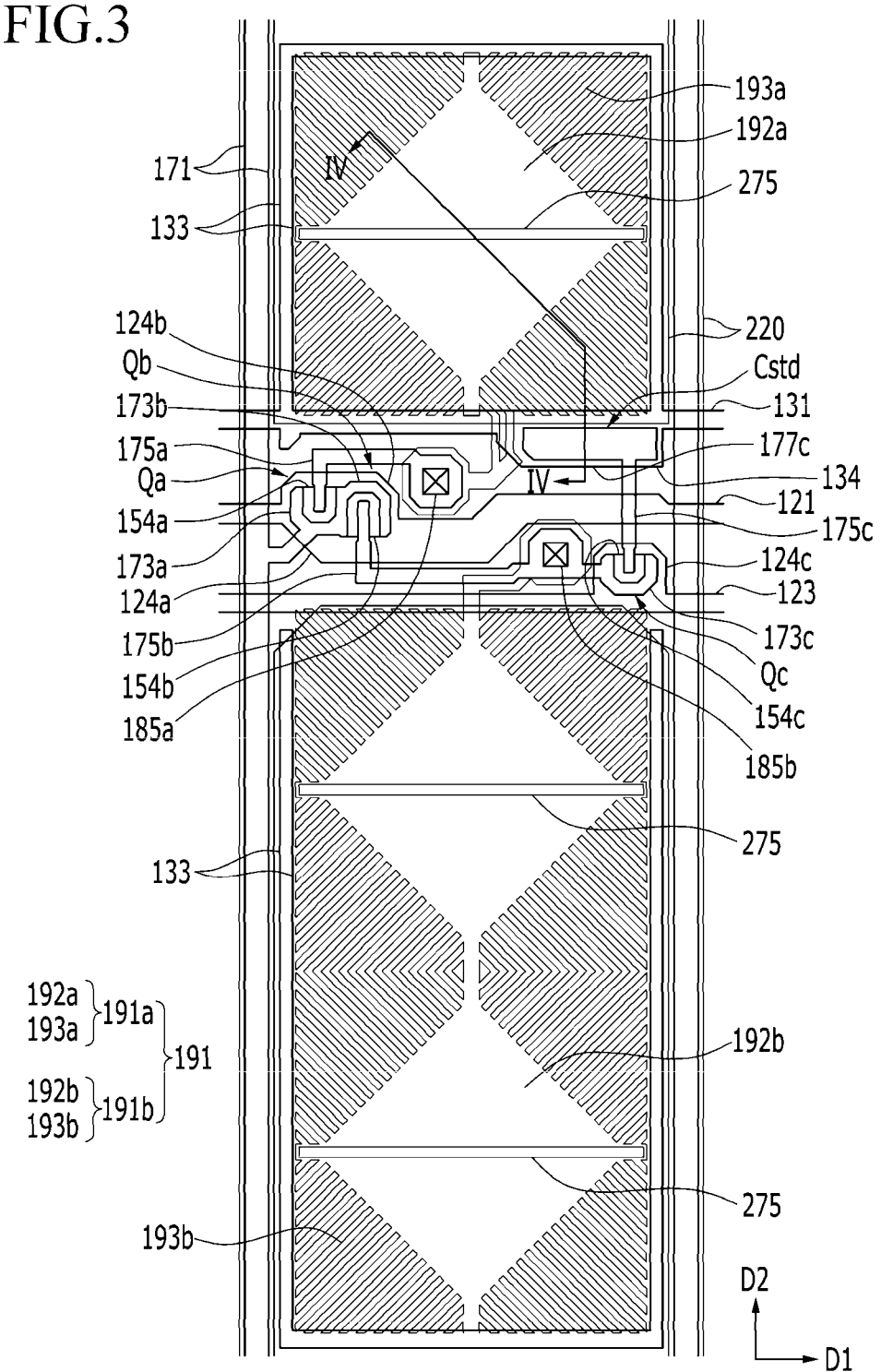
FIG. 3 is a schematic plan view illustrating elements and/or structures in a pixel of a curved liquid crystal display according to an embodiment.
Figure 4:
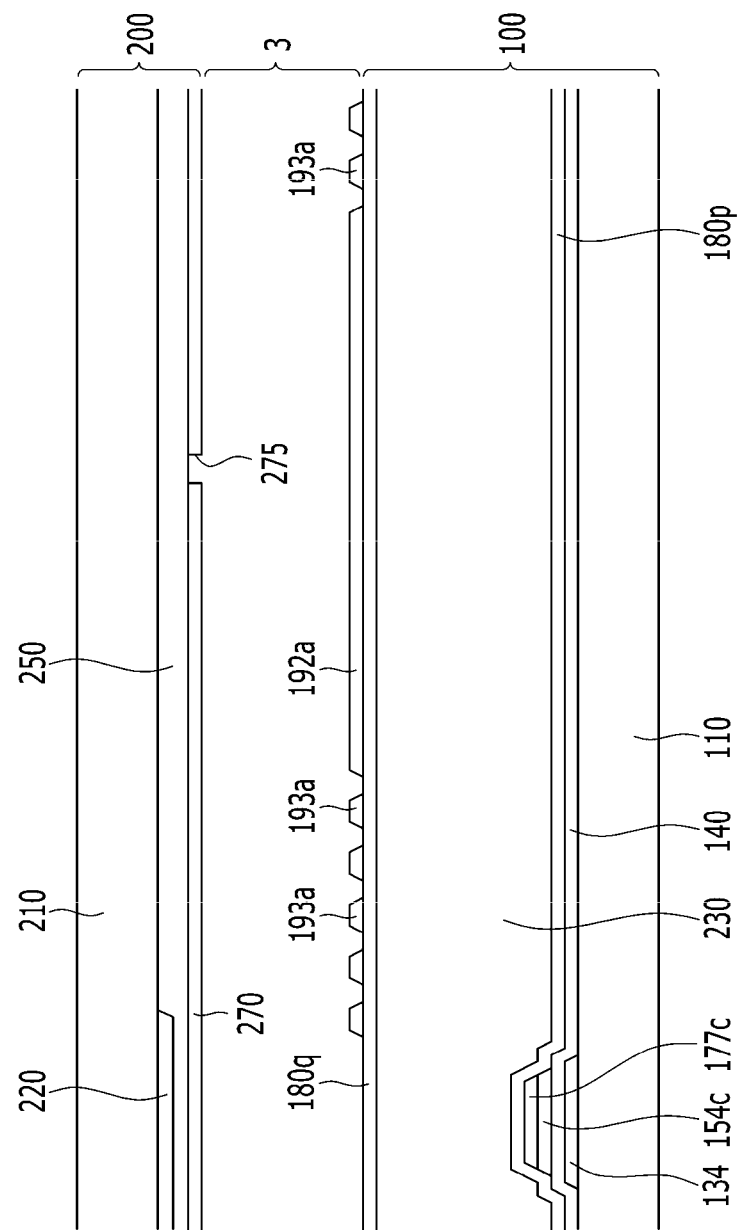
FIG. 4 is a schematic cross-sectional view taken along a line IV-IV indicated in FIG. 3 according to an embodiment.

FIG. 1 is a schematic perspective view illustrating a curved liquid crystal display device 1000 (or curved liquid crystal display 1000 or display device 1000 for conciseness) according to an embodiment. FIG. 2 is a schematic circuit diagram illustrating elements and/or structures in a pixel of the curved liquid crystal display 1000 according to an embodiment. FIG. 3 is a schematic plan view illustrating elements and/or structures in the pixel of the curved liquid crystal display 1000 according to an embodiment. FIG. 4 is a schematic cross-sectional view taken along a line IV-IV indicated in FIG. 3 according to an embodiment.

Referring to FIG. 1, the curved liquid crystal display 1000 is curved with a predetermined curvature. The curved liquid crystal display 1000 is curved with respect to a first direction D1. In manufacturing of the curved liquid crystal display 1000, a flat liquid crystal display is manufactured and then curved to form a curved surface. A geometric radius of curvature associated with the curved liquid crystal display 1000 and/or some curved components of the curved liquid crystal display 1000 may be perpendicular to each of a data line of the curved liquid crystal display 1000, a second direction D2, the first direction D1. The second direction D2 may be perpendicular to the first direction D1. The curved components of the curved liquid crystal display 1000 may include, for example, a curved common electrode, a curved substrate, and a curved gate line. The second direction D2 may be parallel to or aligned with the data line of the curved liquid crystal display 1000.

Referring to FIG. 2, the liquid crystal display 1000 includes signal lines including a gate line 121, a step-down gate line 123, and a data line 171, and a pixel PX connected thereto. A geometric radius of curvature associated with the liquid crystal display 1000 may be perpendicular to the data line 171.

Each pixel PX includes first and second subpixels PXa and PXb. The first subpixel PXa includes a first switching element Qa, a first liquid crystal capacitor Clca, and a first storage capacitor Csta, and the second subpixel PXb includes second and third switching elements Qb and Qc, a second liquid crystal capacitor Clcb, a second storage capacitor Cstb, and a step-down capacitor Cstd.

The first and second switching elements Qa and Qb are connected to the gate line 121 and the data line 171, respectively, and the third switching element Qc is connected to the step-down gate line 123.

The first and second thin film transistors Qa and Qb are three-terminal elements of a thin film transistor, and control terminals thereof are connected to the gate line 121 and input terminals are connected to the data line 171. The output terminal of the first thin film transistor Qa is connected to the first liquid crystal capacitor Clca and the first storage capacitor Csta, and the output terminal of the second thin film transistor Qb is connected to the second liquid crystal capacitor Clcb and the second storage capacitor Cstb.

The third thin film transistor Qc is also a three-terminal element of a thin film transistor, and a control terminal thereof is connected to the step-down gate line 123, an input terminal thereof is connected to the second thin film transistor Qb, and an output terminal thereof is connected to the step-down capacitor Cstd.

The step-down capacitor Cstd is connected to a common voltage together with the output terminal of the third thin film transistor Qc.

An operation of the pixel PX will now be described. First, a gate-on voltage Von is applied to the gate line 121 and the first and second thin film transistors Qa and Qb connected thereto are turned on. Accordingly, the data voltage of the data line 171 is applied to the first and second liquid crystal capacitors Clca and Clcb through the turned-on first and second switching elements Qa and Qb such that the first and second liquid crystal capacitors Clca and Clcb are charged with a difference between the data voltage Vd and the common voltage Vcom. In this instance, the step-down gate line 123 is applied with a gate-off voltage Voff.

Next, when the gate off voltage Voff is applied to the gate line 121 and the gate-on voltage Von is applied to the step-down gate line 123 at the same time, the first and second thin film transistors Qa and Qb are turned off, and the third thin film transistor Qc is turned on. Accordingly, a charging voltage of the second liquid crystal capacitor Clcb connected with the output terminal of the second thin film transistor Qb is dropped. In the case of the liquid crystal display, the charge voltage of the second liquid crystal capacitor Clcb may be lower than the charge voltage of the first liquid crystal capacitor Clca. Accordingly, it is possible to improve visibility of the liquid crystal display by differentiating the charge voltages of the first and second liquid crystal capacitors Clca and Clcb.

Referring to FIG. 3 and FIG. 4, the curved liquid crystal display according to the present embodiment includes a lower panel 100 and an upper panel 200 facing each other, a liquid crystal layer 3 interposed between the two display panels 100 and 200, and a pair of polarizers (not shown) attached to outside surfaces of the display panels 100 and 200.

First, the lower panel 100 will be described.

A plurality of gate conductors including a plurality of gate lines 121, a plurality of step-down gate lines 123, and a plurality of storage electrode lines 131 are formed on an insulation substrate 110.

The gate lines 121 and the step-down gate lines 123 may transfer gate signals and mainly extend in a transverse direction. Each gate line 121 includes a first gate electrode 124a and a second gate electrode 12b1 protruding upward and downward, and each step-down gate line 123 includes a third gate electrode 124c protruding upward. The first gate electrode 124a and the second gate electrode 124b are connected to each other, thereby forming one protrusion.

The storage electrode lines 131 are mainly extended in the transverse direction, and may transfer a predetermined voltage such as the common voltage Vcom. The storage electrode line 131 includes a storage electrode 133 formed along the edge of a first sub-pixel electrode 191a and a second sub-pixel electrode 191b, and includes a capacitor electrode 134 extending downward.

A gate insulating layer 140 is formed on the gate conductors 121, 123, and 131.

A plurality of semiconductors made of at least one of hydrogenated amorphous silicon (a-Si), polysilicon, etc. may be formed on the gate insulating layer 140. The semiconductors 154a, 154b, and 154c include a first semiconductor 154a positioned on the first gate electrode 124a, a second semiconductor 154b positioned on the second gate electrode 124b, and a third semiconductor 154c positioned on the third gate electrode 124c. The first semiconductor 154a may be positioned under the data line 171, and the third semiconductor 154c may be also positioned on the capacitor electrode 134

A plurality of ohmic contacts (not shown) may be further formed on the semiconductors 154a, 154b, and 154c. A first ohmic contact (not shown) is formed on the first semiconductor 154a, and a second ohmic contact (not shown) and a third ohmic contact (not shown) are formed on the second semiconductor 154b and the third semiconductor 154c.

A data conductor including a plurality of data lines 171, a plurality of first drain electrodes 175a, a plurality of second drain electrodes 175b, and a plurality of third drain electrodes 175c is formed on the semiconductor 154a, 154b, and 154c.

The data lines 171 may transmit data signals and extend in the longitudinal direction thereby intersecting the gate lines 121 and the step-down gate lines 123. Each data line 171 includes a first source electrode 173a and a second source electrode 173b extending toward the first gate electrode 124a and the second gate electrode 124b and connected to each other.

The first drain electrode 175a, the second drain electrode 175b, and the third drain electrode 175c have one end portion having a wide area and the other end portion of a bar shape. The bar end portions of the first drain electrode 175a and the second drain electrode 175b are partially enclosed by the first source electrode 173a and the second source electrode 173b. The wide end portion of the second drain electrode 175b is again extended thereby forming a third source electrode 173c of a "U" shape. A wide end portion 177c of the third drain electrode 175c overlaps the capacitor electrode 134 thereby forming the step-down capacitor Cstd, and the bar end portion is partially enclosed by the third source electrode 173c.

The first/second/third gate electrode 124a/124b/124c, the first/second/third source electrode 173a/173b/173c, and the first/second/third drain electrode 175h/175l/175c form a first/second/third thin film transistor (TFT) Qh/Ql/Qc along with the first/second/third semiconductor 154a/154b/154c, and a channel of the thin film transistor is respectively formed in the first/second/third semiconductor 154a/154b/154c between the source electrode first/second/third 173a/173b/173c and the first/second/third drain electrode 175a/175b/175c. Each channel of the thin film transistors is formed in each of the semiconductors 154a/154b/154c between the source electrode 173a/173b/173c and the drain electrodes 175a/175b/175c.

The semiconductors 154a, 154b, and 154c are substantially the same shape as the data conductor 171, 175a, 175b, and 175c except for the channel region between the source electrodes 173a, 173b, and 173c and the drain electrodes 175a, 175b, and 175c. The semiconductors 154a, 154b, and 154c have a portion that is exposed without being covered by the data conductors 171, 175h, 1751, and 175c, and a portion between the source electrodes 173a, 173b, and 173c and the drain electrodes 175a, 175b, and 175c.

A lower passivation layer 180p made of an inorganic insulator such as a silicon nitride or a silicon oxide is formed on the data conductors 171, 175a, 175b, and 175c and the exposed semiconductors 154a, 154b, and 154c. If necessary, the lower passivation layer 180p may be omitted.

A color filter 230 is positioned on the lower passivation layer 180p. Each color filter 230 is formed long in a space in the longitudinal direction between the neighboring data lines 171. Each color filter 230 may display one of three primary colors such as red, green, and blue, and the color filters 230 may overlap each other on the data line 171. In an embodiment, the color filter 230 is formed in the lower panel 100. In an embodiment, the color filter 230 may be formed in an upper panel 200.

An upper passivation layer 180q is formed on the color filter 230. The upper passivation layer 180q prevents peeling of the color filter 230, and suppresses contamination of the liquid crystal layer 3 by an organic material of the solvent that flows from the color filter 230, so it prevents defects such as afterimages that may occur when an image is driven, and may be made of the inorganic insulator such as a silicon nitride or a silicon oxide, or the organic material. The upper passivation layer 180q may be omitted if necessary.

The lower passivation layer 180p, the color filter 230, and the upper passivation layer 180q have a plurality of first contact holes 185a and a plurality of second contact holes 185b respectively exposing the wide end portion of the first drain electrode 175a and the wide end portion of the second drain electrode 175b.

A plurality of pixel electrodes 191 are formed on the upper passivation layer 180q. The pixel electrode 191 includes a first sub-pixel electrode 191a and a second sub-pixel electrode 191b that are separated based on two gate lines 121 and 123, are disposed up and down of the pixel area, and neighbor in the column direction. The first sub-pixel electrode 191a is connected to the first drain electrode 175a through the first contact hole 185a. The second sub-pixel electrode 191b is connected to the second drain electrode 175b through the second contact hole 185b.

The first sub-pixel electrode 191a and the second sub-pixel electrode 191b respectively include plate electrodes 192a and 192b and a plurality of minute branch electrodes 193a and 193b extending from the plate electrodes 192a and 192b.

The first sub-pixel electrode 191a includes a first plate electrode 192a and a first minute branch electrode 193a extending from the first plate electrode 192a. The first plate electrode 192a is formed of a rhombus shape. A transverse diagonal of the rhombus shape is parallel to a first direction D1 that is a curvature direction of the curved liquid crystal display 1000 according to an embodiment. The longitudinal diagonal of the rhombus shape is perpendicular to the first direction D1 that is the curvature direction of the curved liquid crystal display 1000 according to an embodiment. That is, the longitudinal diagonal of the rhombus shape is parallel to a second direction D2 perpendicular to the first direction D1. The first minute branch electrode 193a extends while forming an angle of about 90 degrees for each side of the rhombus shape.

The second sub-pixel electrode 191b includes a second plate electrode 192b and a second minute branch electrode 193b extending from the second plate electrode 192b. The second plate electrode 192b is formed of the rhombus shape. The transverse diagonal of the rhombus shape is parallel to the first direction D1 that is the curvature direction of the curved liquid crystal display 1000 according to an embodiment. The longitudinal diagonal of the rhombus shape is perpendicular to the first direction D1 that is the curvature direction of the curved liquid crystal display 1000 according to an embodiment. That is, the longitudinal diagonal of the rhombus shape is parallel to a second direction D2 vertical to the first direction D1. The first minute branch electrode 193a extends while forming an angle of about 90 degrees with each side of the rhombus shape.

In FIG. 3, the first sub-pixel electrode 191a is made of one first plate electrode 192a and the first minute branch electrode 193a extending therefrom. In an embodiment, the first sub-pixel electrode 191a may be made of at least one first plate electrode 192a and the first minute branch electrodes 193a extending therefrom.

In an embodiment, the second sub-pixel electrode 191b is formed of two second plate electrodes 192b and the second minute branch electrodes 193b extending therefrom. In an embodiment, the second sub-pixel electrode 191b may be made of one second plate electrode 192b and the second minute branch electrode 193b extending therefrom. In an embodiment, the second sub-pixel electrode 191b may be made of three or more second plate electrodes 192b and the second minute branch electrodes 193b extending therefrom.

The first sub-pixel electrode 191a and the second sub-pixel electrode 191b respectively receive the data voltage from the first drain electrode 175a and the second drain electrode 175b. The first sub-pixel electrode 191a and the second sub-pixel electrode 191b that are applied with the data voltage along with a common electrode 270 of the upper panel 200 generate an electric field, thereby determining the direction of the liquid crystal molecules of the liquid crystal layer 3 between the two electrodes 191 and 270. The luminance of the light passing through the liquid crystal layer 3 is changed depending on the above determined direction of the liquid crystal molecules.

The first subpixel electrode 191a and the common electrode 270 constitute the first liquid crystal capacitor Clca together with the liquid crystal layer 3 therebetween, and the second subpixel electrode 191b and the common electrode 270 constitute the second liquid crystal capacitor Clcb together with the liquid crystal layer 3 therebetween, and thus the applied voltage is maintained even after the first and second thin film transistors Qa and Qb are turned off.

The first subpixel electrode 191a and the second subpixel electrode 191b each overlap the storage electrode line 131 as well as the storage electrode 133 to form the first storage capacitor Csta and the second storage capacitor Cstb, and the first storage capacitor Csta and the second storage capacitor Cstb each strengthen a voltage storage ability of the first liquid crystal capacitor Clca and the second liquid crystal capacitor Clcb.

The capacitor electrode 134 and the wide end portion 177c of the third drain electrode 175c overlap with each other with the gate insulating layer 140 therebetween to form the step-down capacitor Cstd.

The lower alignment layer (not shown) is formed on the pixel electrode 191 and the exposed upper passivation layer 180q. The lower alignment layer may be a vertical alignment layer and may include a photo-reactive material.

Next, the upper panel 200 will be described.

A light blocking member 220 is positioned under an insulation substrate 210 made of glass or plastic. The light blocking member 220 is referred to as a black matrix and prevents light leakage. The light blocking member 220 is extended upward and downward according to the gate line 121 and the step-down gate line 123, and covers a region of the first thin film transistor Qh, the second thin film transistor Ql, and the third thin film transistor Qc, and extends according to the data line 171 and covers the surroundings of the data line 171. The region that is not covered by the light blocking member 220 emits light to the outside, thereby displaying the images.

A planarization layer 250 providing a planar lower surface and made of the organic material is formed under the light blocking member 220. In FIG. 4, the light blocking member 220 is formed in the upper panel 200. In an embodiment, the light blocking member 220 may be formed in the lower panel 100 according to an embodiment.

The common electrode 270 made of the transparent conductive material is formed under the planarization layer 250. A slit 275 as a liquid crystal control means is formed in the common electrode 270. The slit 275 may be formed of a bar shape and extends in one direction. The extension of the slit 275 is parallel to the first direction D1 as the curvature direction of the curved liquid crystal display 1000 according to an embodiment. The gate line 121 may be formed along the first direction D1, and thereby the slit 275 may be formed in the direction parallel to the gate line 121.

The slit 275 of the common electrode 270 overlaps the pixel electrode 191. The slit 275 overlaps the plate electrodes 192a and 192b of the pixel electrode 191. The slit 275 overlaps the center portion of the plate electrodes 192a and 192b of the pixel electrode 191. The plate electrodes 192a and 192b are formed of the rhombus shape, and the slit 275 overlaps the transverse diagonal of the rhombus shape.

In the present embodiment, three slits 275 are formed in one pixel area. One slit 275 overlapping the first plate electrode 192a of the first sub-pixel electrode 191a and two slits 275 overlapping two second plate electrodes 192b of the second sub-pixel electrode 191b are formed. That is, the slit 275 overlaps each plate electrodes 192a and 192b.

If the slit 275 of the common electrode 270 is formed of the crossed shape, the slit 275 may be formed in the first direction D1 and the second direction D2 perpendicular to the first direction D1. In the process of realizing the curved liquid crystal display 1000 by bending the flat liquid crystal display, the misalignment is generated between the two display panels 100 and 200, and in this process, the position of the portion of the slit 275 that is extended in the second direction D2 is changed, thereby causing a factor decreasing the transmittance. In the curved liquid crystal display 1000 according to an embodiment, by forming the slit 275 of the common electrode 270 to only be extended in the first direction D1, the transmittance may be improved.

An upper alignment layer (not illustrated) is formed below the common electrode 270. The upper alignment layer may be a vertical alignment layer, and may be photo-aligned by a photo-polymerization material.

Polarizers (not illustrated) are provided on the outer sides of the two panels 100 and 200, and transmissive axes of the two polarizers are perpendicular to each other and one transmissive axis of the transmissive axes may be parallel to the gate line 121. In an embodiment, a polarizer may be disposed only on one outer side of the two panels 100 and 200.

The liquid crystal layer 3 has negative dielectric anisotropy, and the liquid crystal molecules of the liquid crystal layer 3 are aligned so that long axes thereof are perpendicular to the surfaces of the two panels 100 and 200 while an electric field is not applied.

As described above, the first subpixel electrode 191a and the second subpixel electrode 191b to which the data voltage is applied generate the electric field together with the common electrode 270 of the common electrode panel 200, and as a result, the liquid crystal molecules of the liquid crystal layer 3 which are aligned so as to be perpendicular to the surfaces of the two electrodes 191 and 270 while the electric field is not applied are inclined toward the horizontal direction with respect to the surfaces of two electrodes 191 and 270 and luminance of light passing through the liquid crystal layer 3 varies according to the inclined degree of the liquid crystal molecules.

Referring to FIG. 1, FIG. 2, FIG. 3, and FIG. 4, The display device 1000 may include a transistor (e.g., Qa or Qb) (e.g., Qa or Qb), a data line 171, a pixel electrode (e.g., 191a or 191b) (e.g., 191a or 191b), a common electrode 270, and a liquid crystal layer 3. The data line 171 may be electrically connected to a source electrode of the transistor (e.g., Qa or Qb) and may be configured to transmit a data signal. A geometric radius of curvature associated with the display device 1000 may be perpendicular to the data line 171. The pixel electrode (e.g., 191a or 191b) may be electrically connected to a drain electrode of the transistor (e.g., Qa or Qb), may include a first plate electrode (e.g., 192a or 192b), and may include first-set branch electrodes (e.g., 193a or 193b). The first-set branch electrodes (e.g., 193a or 193b) may be electrically and directly connected to sides (e.g., four sides) of the first plate electrode (e.g., 192a or 192b). The sides of the first plate electrode (e.g., 192a or 192b) may be oriented at acute angles with respect to the data line 171 in a plan view associated with the display device 1000. The pixel electrode (e.g., 191a or 191b) may represent a subpixel electrode (e.g., 191a or 191b). The common electrode 270 may overlap the pixel electrode (e.g., 191a or 191b) and may have a first slit 275. The first slit 275 may have a first edge, a second edge, a third edge, and a fourth edge. Each of the first edge and the third edge may be longer than each of the second edge and the fourth edge. The first edge may be perpendicular to the data line 171 in the plan view. The liquid crystal layer 3 may be positioned between the pixel electrode (e.g., 191a or 191b) and the common electrode 270.

Each of the first edge and the third edge may overlap the first plate electrode (e.g., 192a or 192b).

A center of the plate electrode (e.g., 192a or 192b) may be positioned between the first edge and the third edge in the plan view.

The plate electrode (e.g., 192a or 192b) may have a rhombus shape in the plan view. A geometric diagonal of the rhombus shape may be positioned between the first edge and the third edge in the plan view.

The pixel electrode (e.g., 191a or 191b) may include a second plate electrode (e.g., 192a or 192b) and second-set branch electrodes (e.g., 193a or 193b), which may be connected to sides of the second plate electrode (e.g., 192a or 192b). The first plate electrode (e.g., 192a or 192b) may be electrically connected to the second plate electrode (e.g., 192a or 192b). A shape of the first plate electrode (e.g., 192a or 192b) may be identical to a shape of the second plate electrode (e.g., 192a or 192b) in the plan view.

The common electrode 270 may have a second slit 275. The first edge may overlap the first plate electrode (e.g., 192a or 192b). An edge of the second slit 275 may overlap the second plate electrode (e.g., 192a or 192b).

The first slit 275 may be parallel to the second slit 275 in the plan view.

Figure 5:
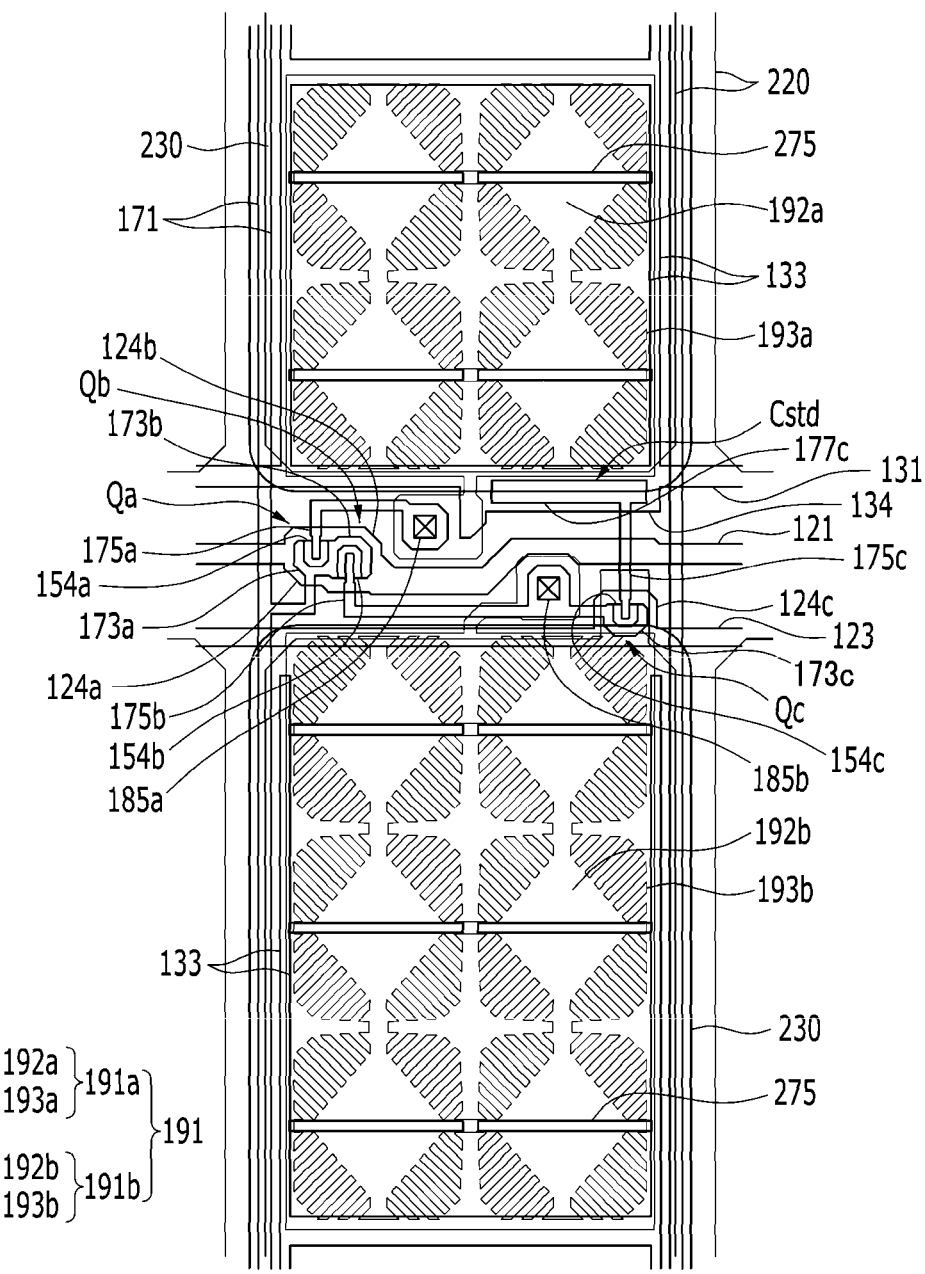
FIG. 5 is a schematic plan view illustrating elements and/or structures in a curved liquid crystal display according to an embodiment.

FIG. 5 is a schematic plan view illustrating elements and/or structures in a curved liquid crystal display according to an embodiment. Some features of the display device associated with FIG. 5 may be identical to some features discussed above with reference to one or more of FIGS. 1 to 4. Some features of the display device associated with FIG. 5 may be analogous to some features discussed above with reference to one or more of FIGS. 1 to 4.

Referring to FIG. 5, the pixel electrode 191 includes the first sub-pixel electrode 191a and the second sub-pixel electrode 191b. The first sub-pixel electrode 191a includes the first plate electrode 192a and the first minute branch electrode 193a extending from the first plate electrode 192a. As shown, the first sub-pixel electrode 191a includes four first plate electrodes 192a and the first minute branch electrodes 193a extending from each of the first plate electrodes 192a. The second sub-pixel electrode 191b includes the second plate electrode 192b and the second minute branch electrode 193b extending from the second plate electrode 192b. As shown, the second sub-pixel electrode 191b includes six second plate electrodes 192b and the second minute branch electrodes 193b extending from each of the second plate electrodes 192b. Accordingly, one pixel electrode 191 includes ten plate electrodes 192a and 192b and the minute branch electrodes 193a and 193b extending from each of the plate electrodes 192a and 192b.

The plurality of plate electrodes 192a and 192b are disposed in a matrix shape. Ten plate electrodes 192a and 192b included in one pixel electrode 191 may be disposed in a 2*5 matrix shape.

The common electrode 270 includes the slit 275. The slit 275 may be formed of the bar shape, and the extending direction of the slit 275 is parallel to the first direction D1 that is the curvature direction of the curved liquid crystal display 1000 according to an embodiment.

The slit 275 of the common electrode 270 overlaps the center portion of the plate electrodes 192a and 192b of the pixel electrode 191. The plate electrodes 192a and 192b are formed of the rhombus shape, and the slit 275 overlaps the transverse diagonal of the rhombus shape.

In the present embodiment, ten slits 275 are formed in one pixel area. Four slits 275 overlapping the first sub-pixel electrode 191a of the first plate electrode 192a and six slits 275 overlapping the second sub-pixel electrode 191b of two second plate electrodes 192b are formed. That is, the slits 275 overlap each of the plate electrodes 192a and 192b.

Slits 275 formed in one pixel area may be separated from each other. In an embodiment, two slits 275 separated from each other are formed in one pixel area.

A first slit 275 may be separated from a second slit 275 and may be aligned with the second slit 275 in a direction perpendicular to the data line 171 in the plan view.

Figure 6:
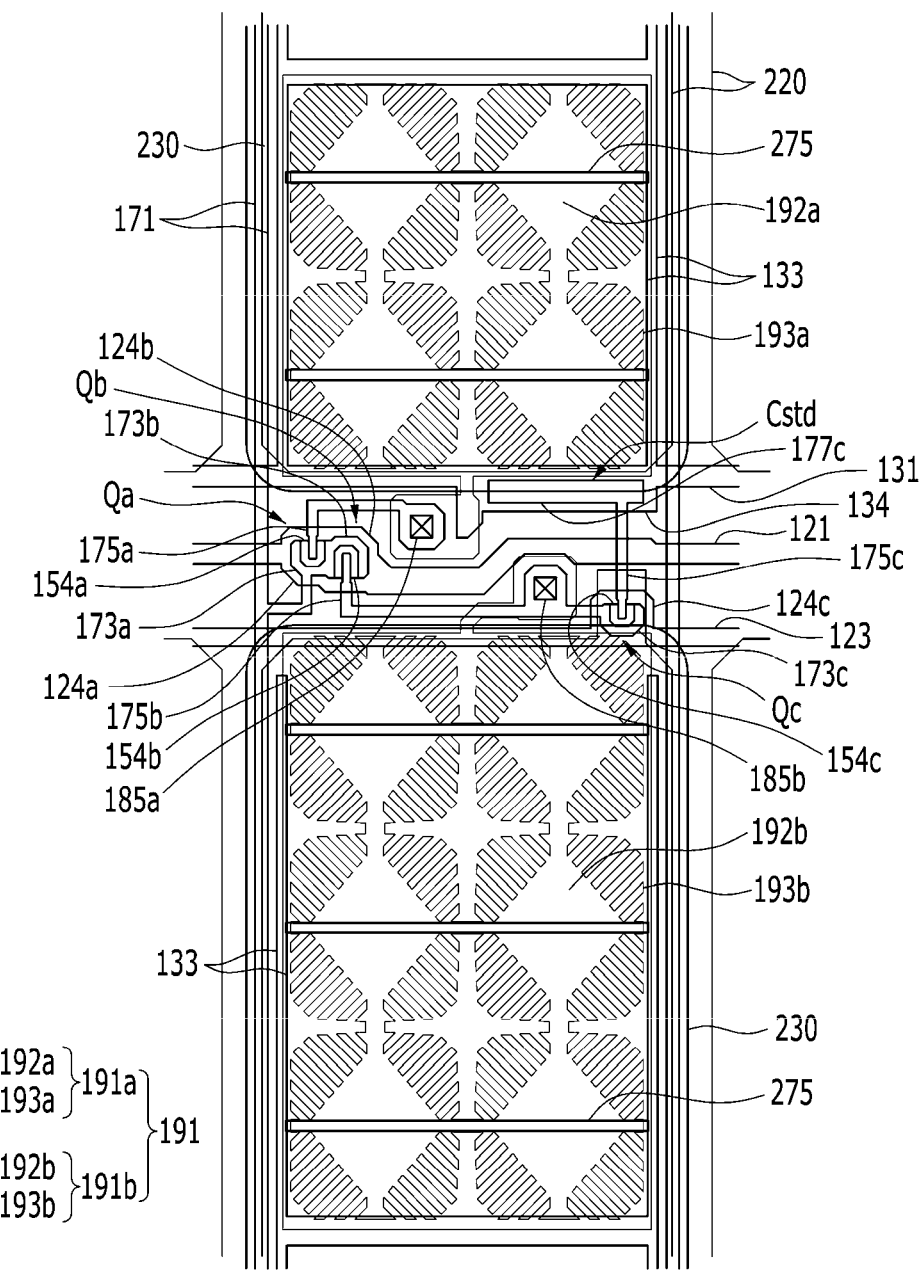
FIG. 6 is a schematic plan view illustrating elements and/or structures in a curved liquid crystal display according to an embodiment.

FIG. 6 is a schematic plan view illustrating elements and/or structures in a curved liquid crystal display according to an embodiment. Some features of the display device associated with FIG. 6 may be identical to some features discussed above with reference to one or more of FIGS. 1 to 5. Some features of the display device associated with FIG. 6 may be analogous to some features discussed above with reference to one or more of FIGS. 1 to 5.

Referring to FIG. 6, the pixel electrode 191 includes the first sub-pixel electrode 191a and the second sub-pixel electrode 191b. The pixel electrode 191 includes a plurality of plate electrodes 192a and 192b and the minute branch electrodes 193a and 193b extending from the plate electrodes 192a and 192b. The plurality of plate electrodes 192a and 192b are disposed in the matrix shape.

The common electrode 270 includes the slit 275 formed in the direction parallel to the first direction D1 that is the curvature direction of the curved liquid crystal display 1000 according to an embodiment. The slit 275 overlaps each of the plate electrodes 192a and 192b.

The portions among the plurality of slits 275 formed in one pixel area are connected to each other. Two edges of a first slit 275 (which may represent two connected slits) may overlap two plate electrodes 192a adjacent in the first direction (in the plan view) and connected to each other. Two edges of a second slit 275 (which may represent two connected slits) may overlap two plate electrodes 192b adjacent in the first direction (in the plan view) and connected to each other.

Figure 7:
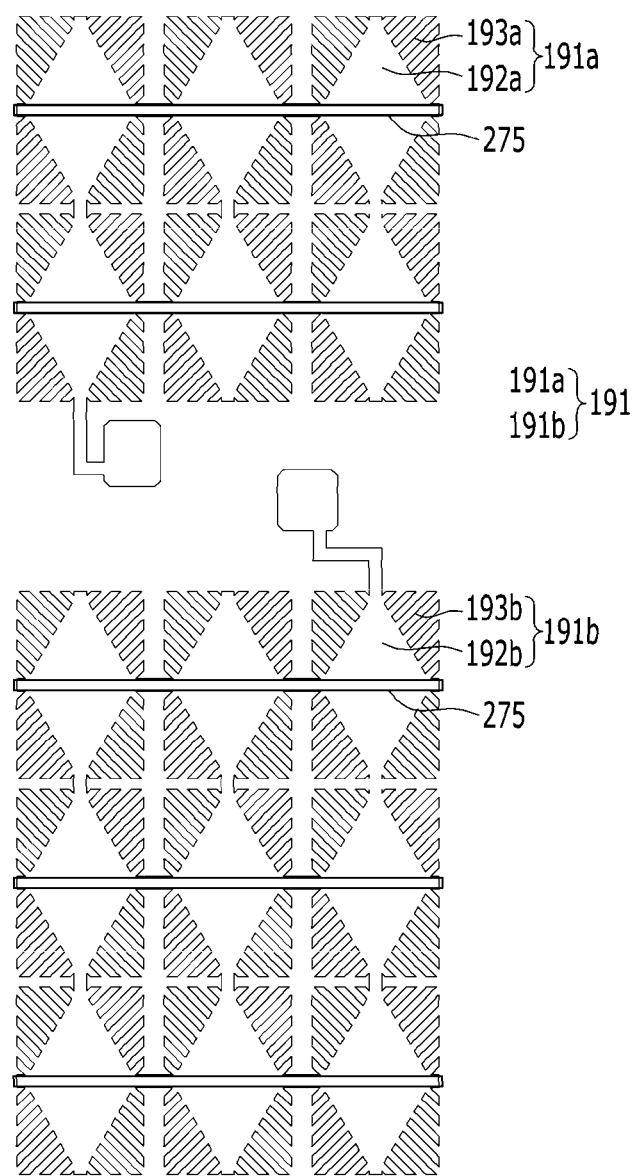
FIG. 7 is a schematic plan view illustrating elements and/or structures in a curved liquid crystal display according to an embodiment.

FIG. 7 is a schematic plan view illustrating elements and/or structures in a curved liquid crystal display according to an embodiment. Some features of the display device associated with FIG. 7 may be identical to some features discussed above with reference to one or more of FIGS. 1 to 6. Some features of the display device associated with FIG. 7 may be analogous to some features discussed above with reference to one or more of FIGS. 1 to 6.

Referring to FIG. 7, the pixel electrode 191 includes the first sub-pixel electrode 191a and the second sub-pixel electrode 191b. The first sub-pixel electrode 191a includes six first plate electrodes 192a and the first minute branch electrodes 193a extending from each of the first plate electrodes 192a. The second sub-pixel electrode 191b includes nine second plate electrodes 192b and the second minute branch electrodes 193b extending from each of the second plate electrodes 192b. Accordingly, one pixel electrode 191 includes fifteen plate electrodes 192a and 192b and the minute branch electrodes 193a and 193b extending from each of the plate electrodes 192a and 192b.

The plurality of plate electrodes 192a and 192b may be disposed in a matrix (or array). Fifteen plate electrodes 192a and 192 included in one pixel electrode 191 may be disposed in a 3-by-5 matrix (or array).

The common electrode 270 includes the slits 275, and the slits 275 overlap each of the plate electrodes 192a and 192b. The plurality of slits respectively overlapping three plate electrodes 192a and 192b adjacent in the first direction may be connected to each other. In an embodiment, the plurality of slits overlapping each of the plate electrodes 192a and 192b may be separated from each other.

Figure 8:
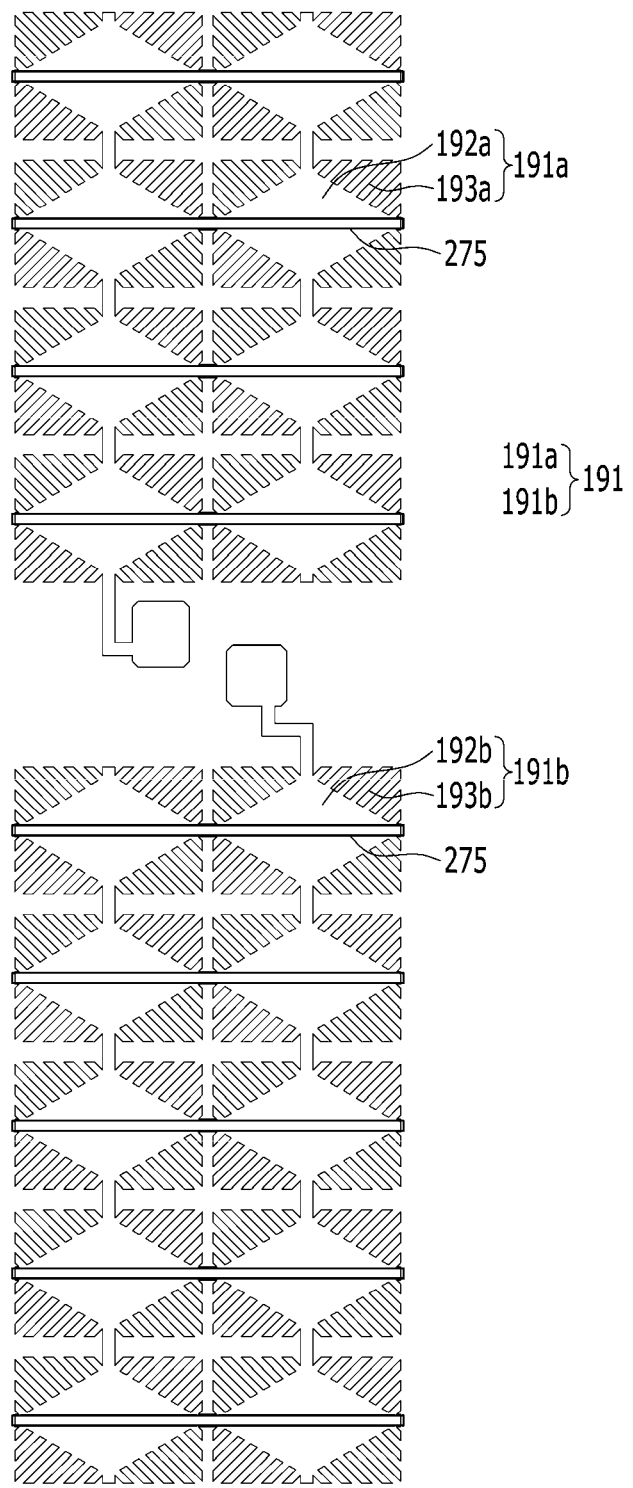
FIG. 8 is a schematic plan view illustrating elements and/or structures in a curved liquid crystal display according to an embodiment.

FIG. 8 is a schematic plan view illustrating elements and/or structures in a curved liquid crystal display according to an embodiment. Some features of the display device associated with FIG. 8 may be identical to some features discussed above with reference to one or more of FIGS. 1 to 7. Some features of the display device associated with FIG. 8 may be analogous to some features discussed above with reference to one or more of FIGS. 1 to 7.

Referring to FIG. 8, the pixel electrode 191 includes the first sub-pixel electrode 191a and the second sub-pixel electrode 191b. The first sub-pixel electrode 191a includes eight first plate electrodes 192a and the first minute branch electrodes 193a extending from each of the first plate electrodes 192a. The second sub-pixel electrode 191b includes ten second plate electrodes 192b and the second minute branch electrodes 193b extending from each of the second plate electrodes 192b. Accordingly, one pixel electrode 191 includes eighteen plate electrodes 192a and 192b and the minute branch electrodes 193a and 193b extending from each of the plate electrodes 192a and 192b.

The plurality of plate electrodes 192a and 192b are disposed in a matrix (or array). Eighteen plate electrodes 192a and 192b included in one pixel electrode 191 may be disposed in a 2-by-9 matrix (or array).

The common electrode 270 includes the slits 275, and the slits 275 overlap each of the plate electrodes 192a and 192b. The plurality of slits respectively overlapping two plate electrodes 192a and 192b adjacent in the first direction may be connected to each other. In an embodiment, the plurality of slits overlapping each of the plate electrodes 192a and 192b may be separated from each other.

Figure 9:
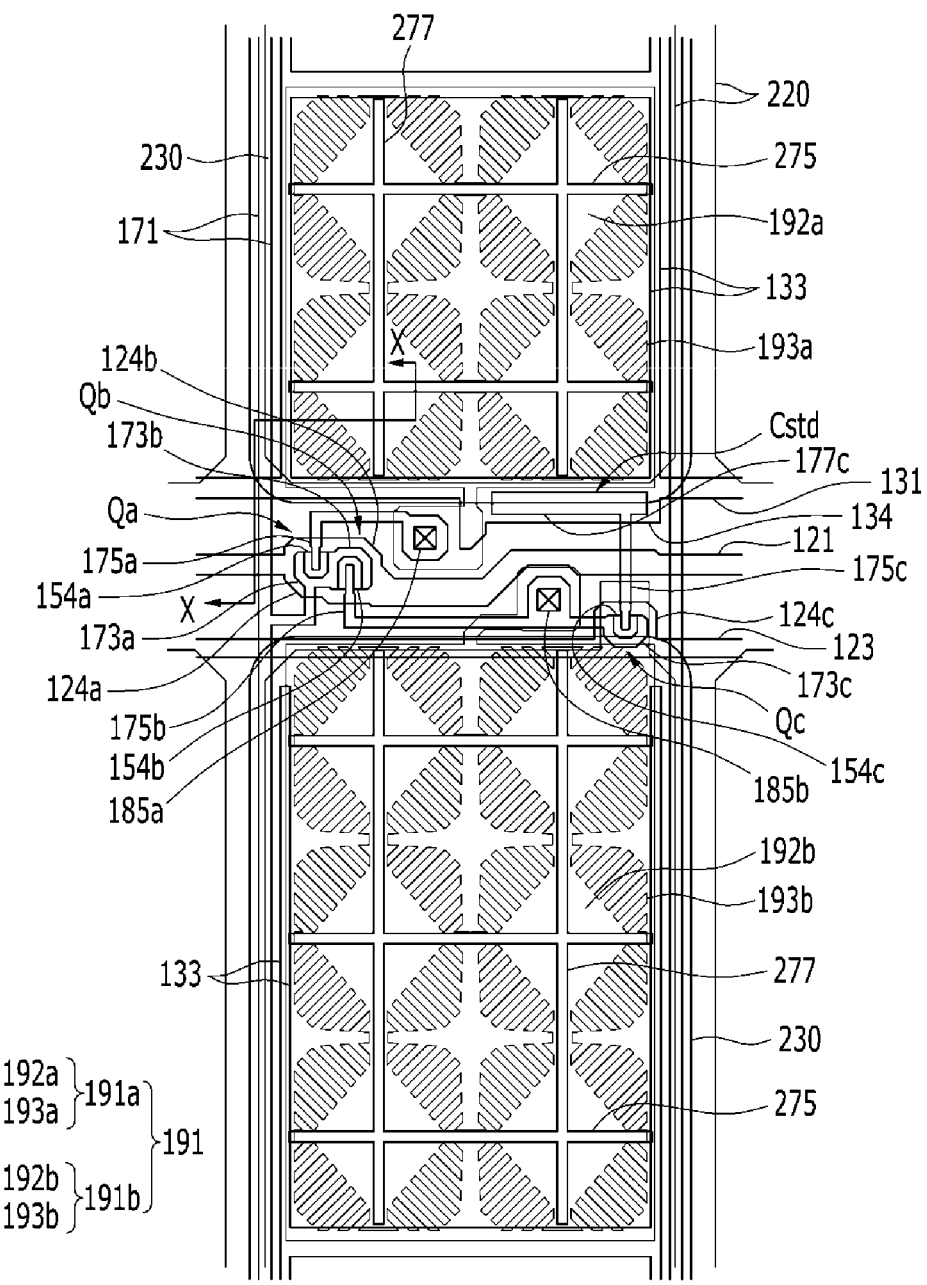
FIG. 9 is a schematic plan view illustrating elements and/or structures in a curved liquid crystal display according to an embodiment.
Figure 10:
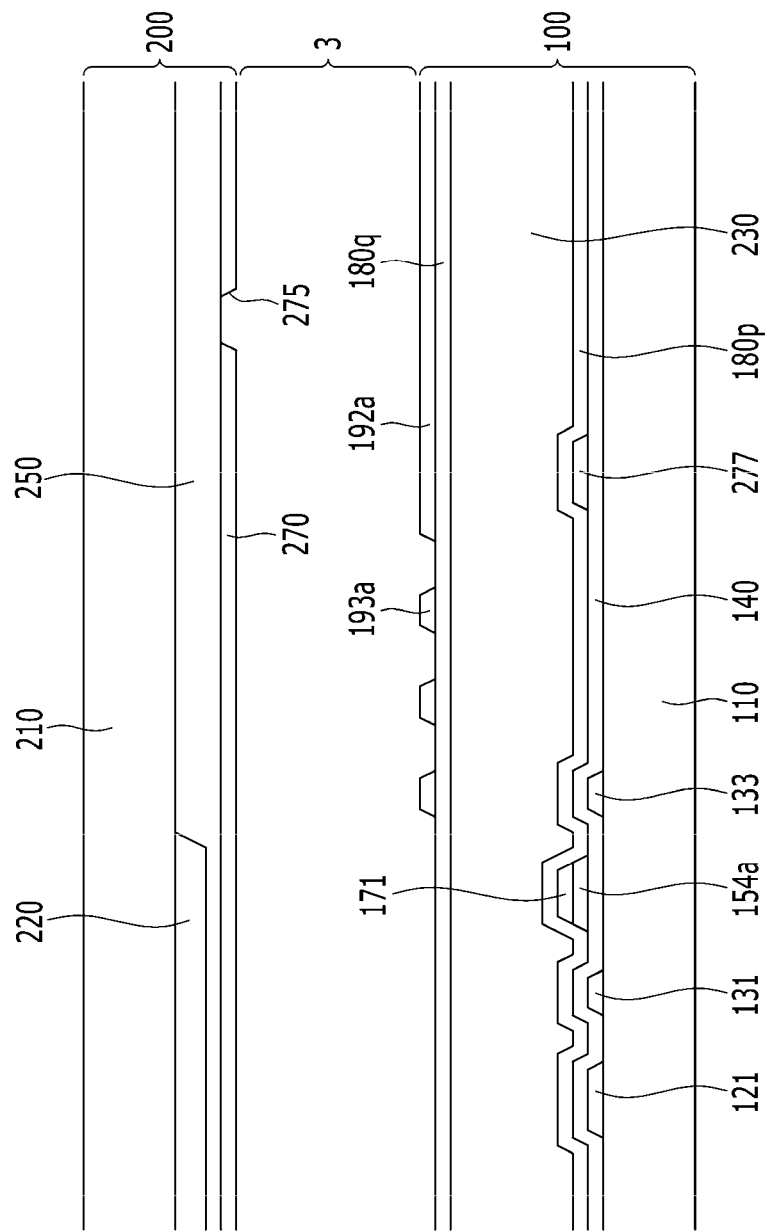
FIG. 10 is a schematic cross-sectional view taken along a line X-X indicated in FIG. 9 according to an embodiment.

FIG. 9 is a schematic plan view illustrating elements and/or structures in a curved liquid crystal display according to an embodiment. FIG. 10 is a schematic cross-sectional view taken along a line X-X indicated in FIG. 9 according to an embodiment. Some features of the display device associated with FIG. 9 and FIG. 10 may be identical to some features discussed above with reference to one or more of FIGS. 1 to 8. Some features of the display device associated with FIG. 9 and FIG. 10 may be analogous to some features discussed above with reference to one or more of FIGS. 1 to 8.

Referring to FIG. 9 and FIG. 10, the pixel electrode 191 includes a plurality of plate electrodes 192a and 192b and the minute branch electrodes 193a and 193b extending from the plate electrodes 192a and 192b. The common electrode 270 includes the slit 275 formed in the direction parallel to the first direction D1 that is the curvature direction of the curved liquid crystal display 1000 according to an embodiment. The slit 275 overlaps each of the plate electrodes 192a and 192b.

The curved liquid crystal display according to an embodiment includes a first metal member 277 positioned on the first substrate 110. The first metal member 277 may be formed and extended in one direction. The extension direction of the first metal member 277 is parallel to the second direction D2 perpendicular to the first direction D1 that is the curvature direction of the curved liquid crystal display 1000 according to an embodiment. The data line 171 may be formed along the second direction D2, and accordingly, the first metal member 277 may be formed in the direction parallel to the data line 171.

The first metal member 277 overlaps the pixel electrode 191. The first metal member 277 overlaps the plate electrodes 192a and 192b of the pixel electrode 191. The first metal member 277 overlaps the center portion of the plate electrodes 192a and 192b of the pixel electrode 191. The plate electrodes 192a and 192b are formed of the rhombus shape, and the first metal member 277 overlaps the longitudinal diagonal of the rhombus shape.

The first metal member 277 overlaps each of the plate electrodes 192a and 192b. The portion of the plurality of first metal members 277 formed in one pixel area may be connected. A portion among the plurality of first metal members 277 respectively overlapping the plate electrodes 192a and 192b adjacent in the second direction may be connected to each other. In an embodiment, the plurality of first metal members 277 respectively overlapping the plurality of plate electrodes 192a and 192b may be separated from each other.

The first metal member 277 may be formed with the same layer as the gate line 121 and may be formed of the same metal as the gate line 121.

The first metal member 277 may be formed with a different layer from the gate line 121, and this will be described with reference to FIG. 11.

Figure 11:
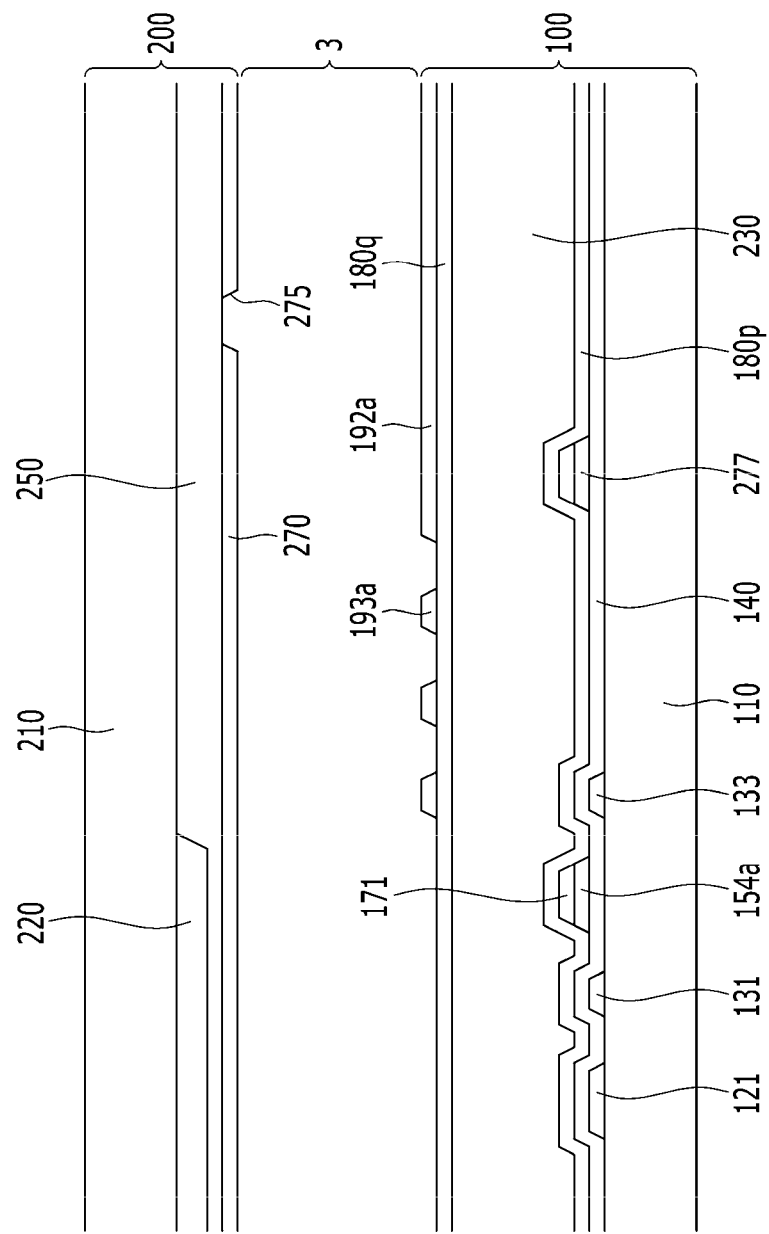
FIG. 11 is a schematic cross-sectional view illustrating elements and/or structures in a curved liquid crystal display according to an embodiment.

FIG. 11 is a schematic cross-sectional view of illustrating elements and/or structures in curved liquid crystal display according to an embodiment. Some features of the display device associated with FIG. 11 may be identical to some features discussed above with reference to one or more of FIGS. 1 to 10. Some features of the display device associated with FIG. 11 may be analogous to some features discussed above with reference to one or more of FIGS. 1 to 10.

Referring to FIG. 11, the first metal member 277 may be formed with the same material layer as the data line 171 and may be formed of the same metal as the data line 171. In an embodiment, the first metal member 277 may be formed of other layers from the gate line 121 and the data line 171.

Referring to FIG. 9, FIG. 10, and FIG. 11, a metal member 277 may be insulated from the pixel electrode (e.g., 191a or 191b). A plate electrode (e.g., 192a or 192b) may be positioned between the metal member 277 and the liquid crystal layer 3.

A center and/or a geometric diagonal of a first plate electrode (e.g., 192a or 192b) may be positioned between a metal member 277 and the liquid crystal layer 3. A center and/or a geometric diagonal of a second plate electrode (e.g., 192a or 192b) may be positioned between the metal member 277 and the liquid crystal layer 3.

The display device may include a first metal member 277 and a second metal member 277. The first metal member 277 may extend parallel to the data line 171 in the plan view. The first plate electrode (e.g., 192a or 192b) may be positioned between the first metal member 277 and the liquid crystal layer 3. The second metal member 277 may extend parallel to the data line 171 in the plan view. The second plate electrode (e.g., 192a or 192b) may be positioned between the second metal member 277 and the liquid crystal layer 3.

The display device may include a passivation layer 180p, which may directly contact the data line 171, may be positioned between a data line 171 and the liquid crystal layer 3, and may be positioned between a metal member 277 and the liquid crystal layer 3. The passivation layer 180p may directly contact the metal member 277.

The display device may include a gate line 121, which may be electrically connected to a gate electrode of a transistor (e.g., Qa or Qb). The display device may include an insulating layer 140, which may directly contact each of the gate line 121 and a metal member 277.

A metal member 277 may cross a slit 275 at a center of a plate electrode (e.g., 192a or 192b) in a plan view associated with the display device.

A geometric diagonal of a plate electrode (e.g., 192a or 192b) may be positioned between two edges of a metal member 277 in the plan view.

Figure 12:
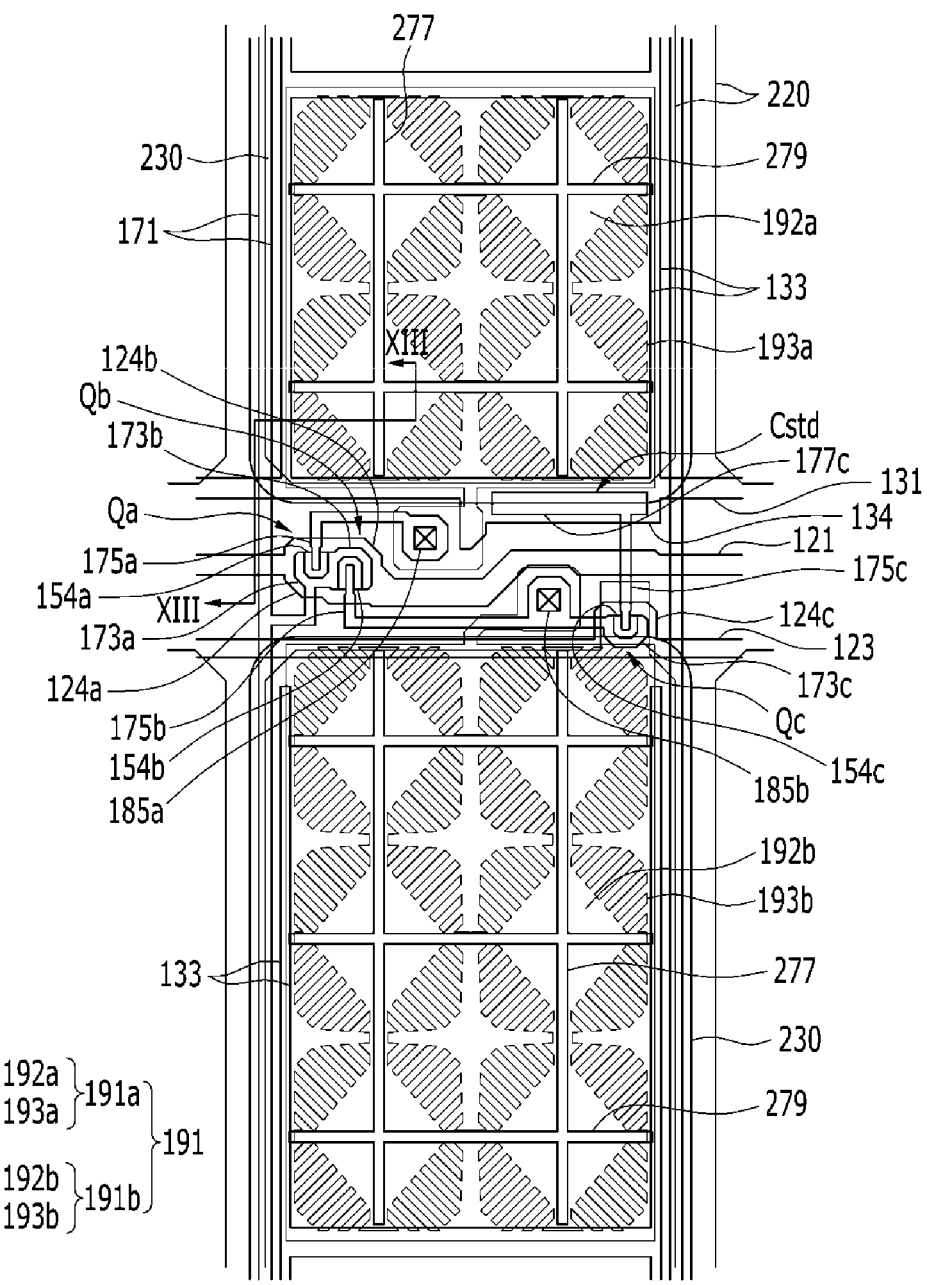
FIG. 12 is a schematic plan view illustrating elements and/or structures in a curved liquid crystal display according to an embodiment.
Figure 13:
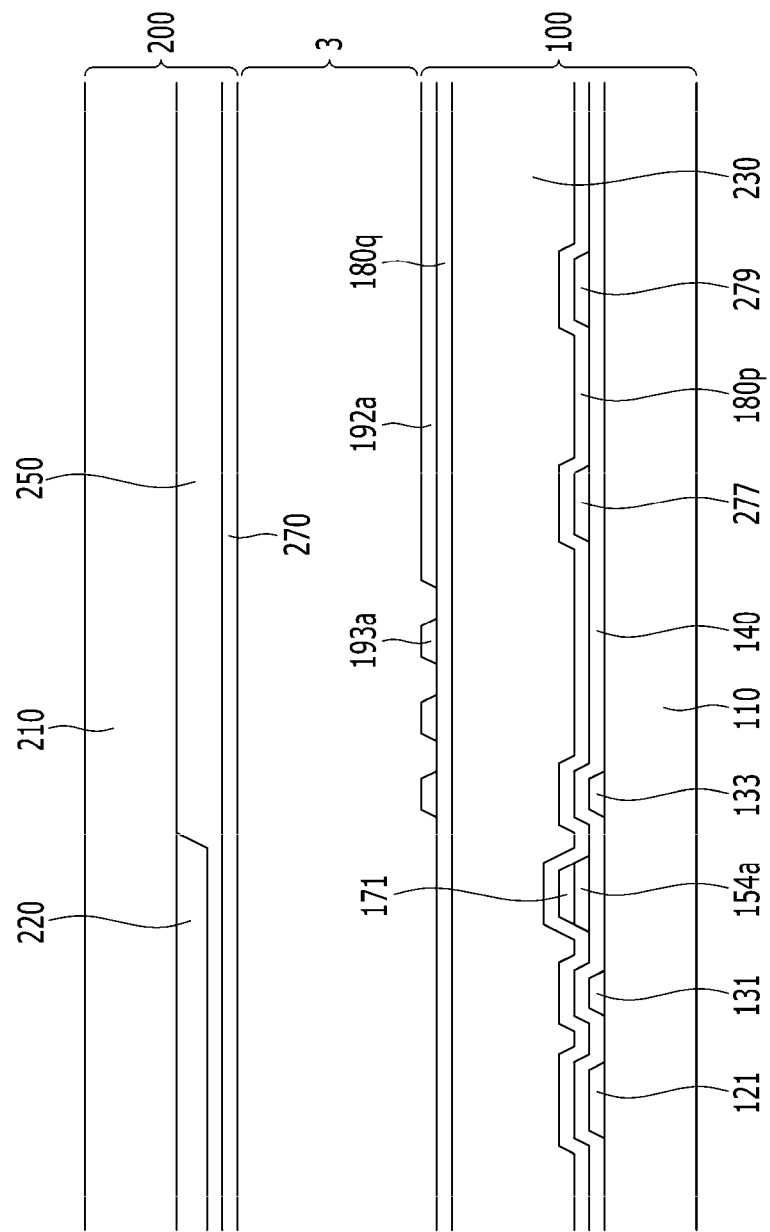
FIG. 13 is a schematic cross-sectional view taken along a line XIII-XIII indicated in FIG. 12 according to an embodiment.

FIG. 12 is a schematic plan view illustrating elements and/or structures in a curved liquid crystal display according to an embodiment. FIG. 13 is a schematic cross-sectional taken along a line XIII-XIII indicated in FIG. 12 according to an embodiment. Some features of the display device associated with FIG. 12 and FIG. 13 may be identical to some features discussed above with reference to one or more of FIGS. 1 to 11. Some features of the display device associated with FIG. 12 and FIG. 13 may be analogous to some features discussed above with reference to one or more of FIGS. 1 to 11.

Referring to FIG. 12 and FIG. 13, the pixel electrode 191 includes a plurality of plate electrodes 192a and 192b and the minute branch electrodes 193a and 193b extending from the plate electrodes 192a and 192b. The common electrode 270 is formed on the entire surface of the second substrate 210. The slit is not formed in the common electrode 270.

The curved liquid crystal display according to an embodiment includes the first metal member 277 and a second metal member 279 positioned on the first substrate 110.

The second metal member 279 crosses the first metal member 277. The second metal member 279 may be formed of the bar shape and may extend in one direction. The extending direction of the second metal member 279 is parallel to the first direction D1 that is the curvature direction of the curved liquid crystal display 1000 according to an embodiment. The gate line 121 may be formed along the first direction D1, and accordingly the second metal member 279 may be formed in the direction parallel to the gate line 121.

The second metal member 279 overlaps the pixel electrode 191. The second metal member 279 overlaps the plate electrodes 192a and 192b of the pixel electrode 191. The second metal member 279 overlaps the center portion of the plate electrodes 192a and 192b of the pixel electrode 191. The plate electrode 192a and 192b are formed of the rhombus shape, and the second metal member 279 overlaps the transverse diagonal of the rhombus shape.

The second metal member 279 overlaps each of the plate electrodes 192a and 192b. A portion among the plurality of second metal members 279 formed in one pixel area may be connected. The plurality of second metal members 279 respectively overlapping the plate electrodes 192a and 192b adjacent in the first direction may be connected to each other. In an embodiment, the plurality of first metal members 277 respectively overlapping the plurality of plate electrodes 192a and 192b may be separated from each other.

The second metal member 270 may be formed with the same layer as the gate line 121, and may be formed of the same metal as the gate line 121. The first metal member 277 and the second metal member 279 may be formed with the same layer, and in an embodiment, the first metal member 277 and the second metal member 279 may be connected to each other in the crossing portion of the first metal member 277 and the second metal member 279.

Figure 14:
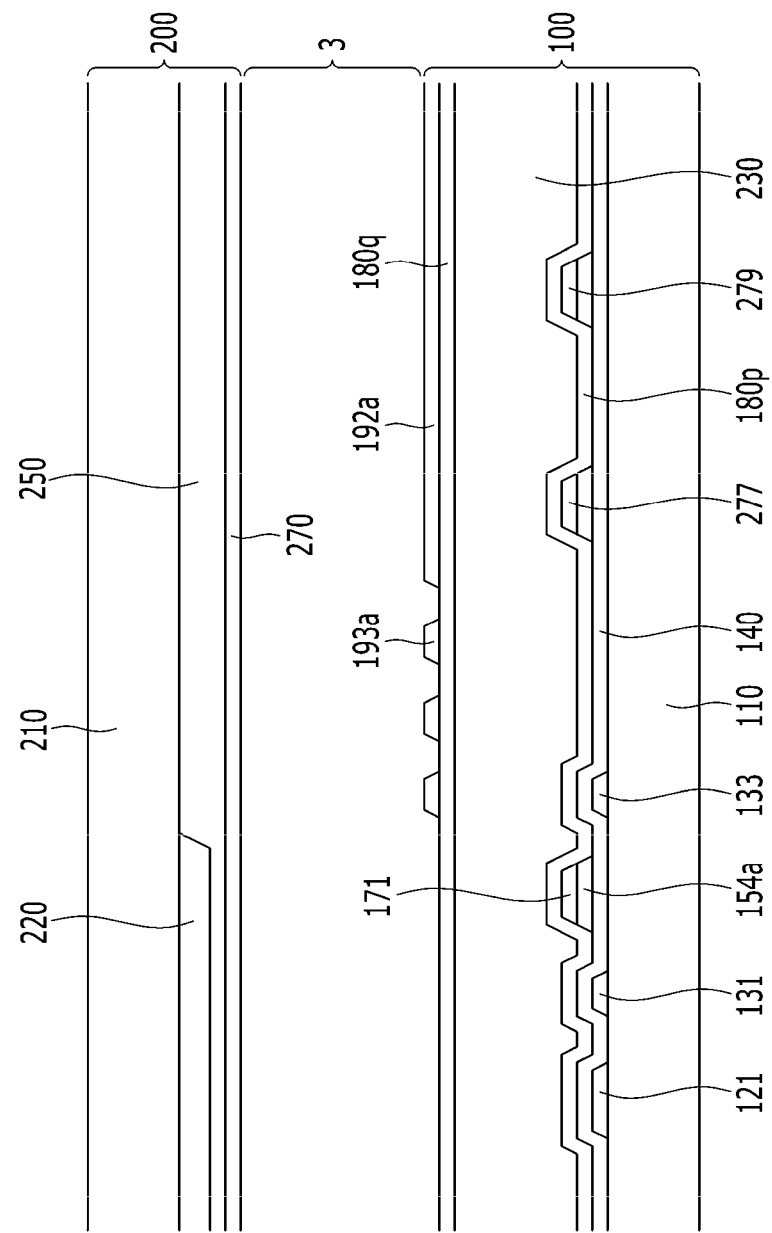
FIG. 14 is a schematic cross-sectional view illustrating elements and/or structures in a curved liquid crystal display according to an embodiment.

FIG. 14 is a schematic cross-sectional view illustrating elements and/or structures in a curved liquid crystal display according to an embodiment. Some features of the display device associated with FIG. 14 may be identical to some features discussed above with reference to one or more of FIGS. 1 to 13. Some features of the display device associated with FIG. 14 may be analogous to some features discussed above with reference to one or more of FIGS. 1 to 13.

Referring to FIG. 14, the second metal member 279 may be formed with the same layer as the data line 171 and may be formed of the same metal as the data line 171. The first metal member 277 may be formed with the same layer as the data line 171.

Figure 15:
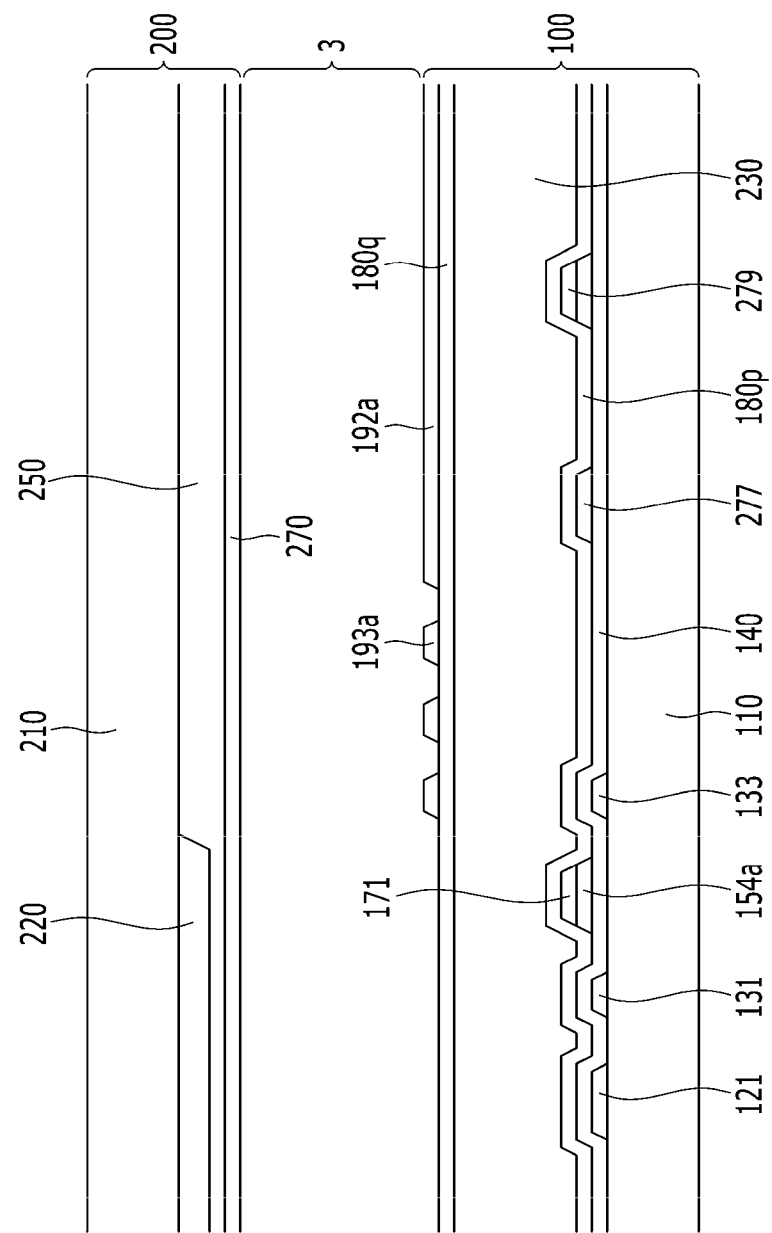
FIG. 15 is a schematic cross-sectional view illustrating elements and/or structures in a curved liquid crystal display according to an embodiment.

FIG. 15 is a schematic cross-sectional view illustrating elements and/or structures in a curved liquid crystal display according to an embodiment. Some features of the display device associated with FIG. 15 may be identical to some features discussed above with reference to one or more of FIGS. 1 to 14. Some features of the display device associated with FIG. 15 may be analogous to some features discussed above with reference to one or more of FIGS. 1 to 14.

Referring to FIG. 15, the first metal member 277 and the second metal member 279 may be formed with different layers from each other. The first metal member 277 may be formed with the same layer as the gate line 121, and the second metal member 279 may be formed with the same layer as the data line 171. In an embodiment, the first metal member 277 and the second metal member 279 are not connected to each other in the crossing portion of the first metal member 277 and the second metal member 279.

In an embodiment, the first metal member 277 may be formed with the same layer as the data line 171 and the second metal member 279 may be formed with the same layer as the gate line 121. In an embodiment, at least one of the first metal member 277 and the second metal member 279 may be formed with another layer different from that of the gate line 121 and the data line 171.

Referring to FIG. 12, FIG. 13, FIG. 14, and FIG. 15, a display device may include a transistor (e.g., Qa or Qb), a data line 171, a first metal member 277, a common electrode 270, a liquid crystal layer 3, and a pixel electrode (e.g., 191a or 191b). The data line 171 may be electrically connected to a source electrode of the transistor (e.g., Qa or Qb) and may be configured to transmit a data signal. A geometric radius of curvature associated with the display device may be perpendicular to the data line 171. The common electrode 270 may overlap the first metal member 277. The liquid crystal layer 3 may be positioned between the first metal member 277 and the common electrode 270. The pixel electrode (e.g., 191a or 191b) may be electrically connected to a drain electrode of the transistor (e.g., Qa or Qb), may be insulated from the first metal member 277, may include a plate electrode (e.g., 192a or 192b), and may include branch electrodes (e.g., 193a or 193b). The plate electrode (e.g., 192a or 192b) may be positioned between the first metal member 277 and the liquid crystal layer 3. The branch electrodes (e.g., 193a or 193b) may be electrically and directly connected to sides of the first plate electrode (e.g., 192a or 192b). The sides of the first plate electrode (e.g., 192a or 192b) may be oriented at acute angles with respect to the data line 171 in a plan view associated with the display device.

The display device may include a second metal member 279, which may be insulated from the plate electrode (e.g., 192a or 192b) and may extend perpendicular to the data line 171 in the plan view. The plate electrode (e.g., 192a or 192b) may be positioned between the second metal member 279 and the liquid crystal layer 3. The first metal member 277 may extend parallel to the data line 171 in the plan view.

A first geometric diagonal of the plate electrode (e.g., 192a or 192b) may be positioned between to edges of the first metal member 277 in the plan view. A second geometric diagonal of the plate electrode (e.g., 192a or 192b) may be positioned between to edges of the second metal member 277 in the plan view.

The second metal member 279 may be directly connected to the first metal member 277.

The second metal member 279 may be insulated from the first metal member 277.

The second metal member 279 may cross the first metal member 277 at a center of the plate electrode (e.g., 192a or 192b) in the plan view.

A material of the second metal member 279 may be identical to a material of the first metal member 277. A material of the second metal member 279 may be identical to a material of the data line 171.

A material of the second metal member 279 may be different from a material of the first metal member 277.

Figure 16:
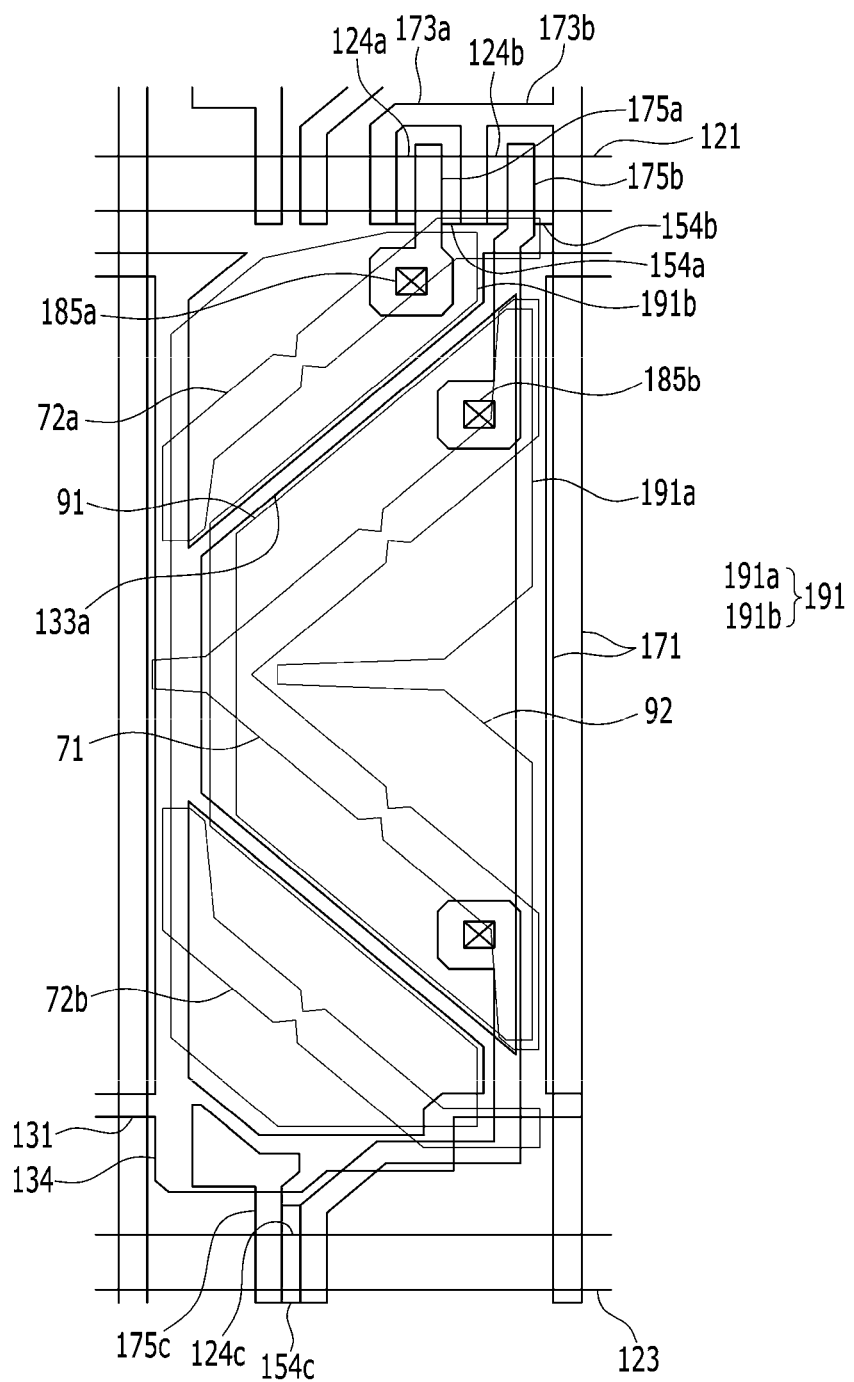
FIG. 16 is a schematic plan view illustrating elements and/or structures in a curved liquid crystal display according to an embodiment.

FIG. 16 is a schematic plan view illustrating elements and/or structures in a curved liquid crystal display according to an embodiment. Some features of the display device associated with FIG. 16 may be identical to some features discussed above with reference to one or more of FIGS. 1 to 15. Some features of the display device associated with FIG. 16 may be analogous to some features discussed above with reference to one or more of FIGS. 1 to 15.

The curved liquid crystal display includes a lower panel 100, an upper panel 200, and a liquid crystal layer 3 interposed between two display panels. The lower panel includes a pixel electrode 191 positioned on the first substrate, and the upper panel includes a common electrode positioned on the second substrate.

The pixel electrode 191 includes the first sub-pixel electrode 191a and the second sub-pixel electrode 191b separated from each other via a gap 91. The first sub-pixel electrode 191a is positioned between two portions of the second sub-pixel electrode 191b. A center recess 92 is formed in the first sub-pixel electrode 191a.

The common electrode may have slits 71, 72a, and 72b. The slit 71 may be disposed between the gap 91 and the center recess 92 in the plan view. Edges of the slits 71, 72a, and 72b may extend parallel to the gap 91 and edges of the center recess 92.

A first portion of the recess 92 may be narrower than a second portion of the recess 92 in a direction parallel to a data line 171 in the plan view. The recess 92 may be positioned between a first portion of the slit 71 and a second portion of the slit 71 in the plan view. The first portion of the recess 92 may be positioned between the slit 71 and the second portion of the recess 92 in the plan view.

The slits 71, 72a, and 72b may have sufficient widths and may not be parallel to the data line 171 in the plan view. Therefore, even if misalignment exists between the pixel electrode 191 and the common electrode, the curved liquid crystal display associated with FIG. 16 can still display images with consistent and/or satisfactory quality.

According to embodiments, in a display device, a common electrode may include one or more slits that are not parallel to a data line in a plan view associated with the display device. Therefore, even if misalignment occurs between a pixel electrode and the common electrode as a result of bending of the display device, control of the liquid crystal layer and light transmittance may not be significantly affected by the misalignment. Advantageously, the display device may display images with consistent and/or satisfactory quality.

While some embodiments have been described as examples, possible embodiments are not limited to the described embodiments. Embodiments are intended to cover various modifications and equivalent arrangements within the spirit and scope defined by the appended claims.

What is claimed is:

1. A display device comprising:
   a transistor;
   a data line, which is electrically connected to a source electrode of the transistor and is configured to transmit a data signal, wherein a geometric radius of curvature associated with the display device is perpendicular to the data line;
   a pixel electrode, which is electrically connected to a drain electrode of the transistor, comprises a first plate electrode, and comprises first-set branch electrodes, wherein the first-set branch electrodes are electrically and directly connected to sides of the first plate electrode, wherein the sides of the first plate electrode are oriented at acute angles with respect to the data line in a plan view associated with the display device;
   a common electrode, which overlaps the pixel electrode and has a first slit, wherein the first slit has a first edge, a second edge, a third edge, and a fourth edge, wherein the first edge is perpendicular to the data line and longer than a distance between two parallel sides of the first plate electrode in the plan view, and wherein each of the first edge and the third edge is longer than each of the second edge and the fourth edge; and
   a liquid crystal layer, which is positioned between the pixel electrode and the common electrode.

2. The display device of claim 1, wherein each of the first edge and the third edge overlaps the first plate electrode.

3. The display device of claim 1, wherein a center of the plate electrode is positioned between the first edge and the third edge in the plan view.

4. The display device of claim 1, wherein the plate electrode has a rhombus shape in the plan view, and wherein a geometric diagonal of the rhombus shape is positioned between the first edge and the third edge in the plan view.

5. The display device of claim 1, comprising:
   a metal member, which is insulated from the pixel electrode,
   wherein the first plate electrode is positioned between the metal member and the liquid crystal layer.

6. The display device of claim 5, comprising:
   a passivation layer, which directly contacts the data line, is positioned between the data line and the liquid crystal layer, and is positioned between the metal member and the liquid crystal layer.

7. The display device of claim 6, wherein the passivation layer directly contacts the metal member.

8. The display device of claim 5, comprising:
   a gate line, which is electrically connected to a gate electrode of the transistor; and
   an insulating layer, which directly contacts each of the gate line and the metal member.

9. The display device of claim 5, wherein the metal member crosses the first slit in the plan view.

10. The display device of claim 5, wherein a geometric diagonal of the first plate electrode is positioned between two edges of the metal member in the plan view.

11. A display device comprising:
    a transistor;
    a data line, which is electrically connected to a source electrode of the transistor and is configured to transmit a data signal, wherein a geometric radius of curvature associated with the display device is perpendicular to the data line;
    a pixel electrode, which is electrically connected to a drain electrode of the transistor, comprises a first plate electrode, comprises first-set branch electrodes, and comprises a second plate electrode, wherein the first-set branch electrodes are electrically and directly connected to sides of the first plate electrode, wherein the sides of the first plate electrode are oriented at acute angles with respect to the data line in a plan view associated with the display device, wherein the first plate electrode is electrically connected to the second plate electrode, and wherein a shape of the first plate electrode is identical to a shape of the second plate electrode in the plan view;
    a common electrode, which overlaps the pixel electrode and has a first slit, wherein the first slit has a first edge, a second edge, a third edge, and a fourth edge, wherein the first edge is perpendicular to the data line in the plan view, and wherein each of the first edge and the third edge is longer than each of the second edge and the fourth edge; and
    a liquid crystal layer, which is positioned between the pixel electrode and the common electrode.

12. The display device of claim 11, wherein the common electrode has a second slit, wherein the first edge overlaps the first plate electrode, and wherein an edge of the second slit overlaps the second plate electrode.

13. The display device of claim 12, wherein the first slit is parallel to the second slit in the plan view.

14. The display device of claim 12, wherein the first slit is separated from the second slit and is aligned with the second slit in a direction perpendicular to the data line in the plan view.

15. The display device of claim 11, wherein each of the first edge and the third edge overlaps each of the first plate electrode and the second plate electrode.

16. The display device of claim 11, comprising:
a metal member, which is insulated from the pixel electrode,
wherein the first plate electrode is positioned between the metal member and the liquid crystal layer, and wherein the second plate electrode is positioned between the metal member and the liquid crystal layer.

17. The display device of claim 11, comprising:
a first metal member, which extends parallel to the data line in the plan view, wherein the first plate electrode is positioned between the first metal member and the liquid crystal layer; and
a second metal member, which extends parallel to the data line in the plan view, wherein the second plate electrode is positioned between the second metal member and the liquid crystal layer.

18. A display device comprising:
a transistor;
a data line, which is electrically connected to a source electrode of the transistor and is configured to transmit a data signal, wherein a geometric radius of curvature associated with the display device is perpendicular to the data line;
a first metal member;
a common electrode, which overlaps the first metal member;
a liquid crystal layer, which is positioned between the first metal member and the common electrode; and
a pixel electrode, which is electrically connected to a drain electrode of the transistor, is insulated from the first metal member, comprises a plate electrode, and comprises branch electrodes, wherein the plate electrode is positioned between the first metal member and the liquid crystal layer, wherein the branch electrodes are electrically and directly connected to sides of the first plate electrode, wherein the sides of the first plate electrode are oriented at acute angles with respect to the data line in a plan view associated with the display device.

19. The display device of claim 18, comprising:
a second metal member, which is insulated from the pixel electrode and extends perpendicular to the data line in the plan view,
wherein the plate electrode is positioned between the second metal member and the liquid crystal layer, and
wherein the first metal member extends parallel to the data line in the plan view.

20. The display device of claim 18, wherein the second metal member crosses the first metal member at a center of the plate electrode in the plan view.

* * * * *